United States Patent
Syed et al.

(10) Patent No.: US 10,764,841 B2
(45) Date of Patent: Sep. 1, 2020

(54) METHODS AND APPARATUS FOR TRANSMISSION POWER MANAGEMENT OF CITIZENS BROADBAND RADIO SERVICE DEVICES

(71) Applicant: Charter Communications Operating, LLC, St. Louis, MO (US)

(72) Inventors: Haider Syed, Parker, CO (US); Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 25 days.

(21) Appl. No.: 16/214,070

(22) Filed: Dec. 8, 2018

(65) Prior Publication Data

US 2020/0187133 A1 Jun. 11, 2020

(51) Int. Cl.
*H04W 52/36* (2009.01)
*H04W 52/24* (2009.01)
*H04W 88/02* (2009.01)

(52) U.S. Cl.
CPC ....... *H04W 52/365* (2013.01); *H04W 52/241* (2013.01); *H04W 88/02* (2013.01)

(58) Field of Classification Search
CPC .... H04J 11/0073; H04W 16/02; H04W 72/10
See application file for complete search history.

(56) References Cited

U.S. PATENT DOCUMENTS

| | | | | |
|---|---|---|---|---|
| 9,775,050 B1* | 9/2017 | Wang | | H04W 16/14 |
| 10,116,381 B1* | 10/2018 | Smyth | | H04W 52/242 |
| 2008/0186842 A1* | 8/2008 | Chong | | H04W 16/14 |
| | | | | 370/204 |
| 2014/0064186 A1* | 3/2014 | Grant | | H04W 52/265 |
| | | | | 370/328 |
| 2017/0295497 A1* | 10/2017 | MacMullan | | H04W 24/02 |
| 2017/0295578 A1* | 10/2017 | Khoshnevisan | | H04L 5/0032 |
| 2018/0014304 A1* | 1/2018 | Khoshnevisan | | H04W 24/08 |
| 2018/0124792 A1* | 5/2018 | Khoshnevisan | | H04B 17/345 |
| 2018/0132112 A1* | 5/2018 | Khoshnevisan | | H04W 16/14 |
| 2018/0242165 A1* | 8/2018 | MacMullan | | H04W 16/14 |
| 2019/0007889 A1* | 1/2019 | Jayawickrama | | H04W 16/14 |
| 2019/0007909 A1* | 1/2019 | Mueck | | H04W 24/02 |
| 2019/0115985 A1* | 4/2019 | Bechta | | G01S 7/021 |
| 2019/0120969 A1* | 4/2019 | Hamzeh | | H04J 11/0073 |
| 2019/0141713 A1* | 5/2019 | Cimpu | | H04W 72/10 |
| 2019/0222339 A1* | 7/2019 | Badic | | H04J 11/0056 |

(Continued)

*Primary Examiner* — Melanie Jagannathan
(74) *Attorney, Agent, or Firm* — Straub & Straub; Stephen P. Straub; Michael P. Straub

(57) ABSTRACT

Methods and apparatus for managing the power transmit level of Citizens Broadband Radio Service Devices (CBSDs) in a Citizens Broadband Radio Service Network. In an exemplary method embodiment a CBSD is operated to: (i) receive from a Spectrum Access System one or more of: (a) a power headroom threshold value used to identify cell edge user equipment devices (UEs) or (b) a channel quality indicator threshold value used to identify cell edge user equipment devices; receive a power down command from the SAS; (ii) identify based on one or more of the received power headroom threshold value and the received channel quality indicator threshold value cell edge UEs being serviced by the CBSD; and (iii) decrease transmit power of the CBSD by an estimated amount of transmit power required to support the identified cell edge UEs.

20 Claims, 19 Drawing Sheets

(56) References Cited

U.S. PATENT DOCUMENTS

2019/0335336 A1* 10/2019 Cimpu .................. H04W 16/10
2020/0037321 A1*  1/2020 Karimli ................ H04W 72/10
2020/0037322 A1*  1/2020 Karimli ............... H04W 72/085
2020/0053669 A1*  2/2020 Hannan ............... H04W 52/243
2020/0059931 A1*  2/2020 Hannan ............. H04W 72/0453

* cited by examiner

METHODS AND APPARATUS FOR TRANSMISSION POWER MANAGEMENT OF CITIZENS BROADBAND RADIO SERVICE DEVICES

FIELD OF INVENTION

The present invention relates to methods and apparatus for managing power transmission levels in Citizens Broadband Radio Service Devices (CBSDs) in Citizens Broadband Radio Service Networks (CBRS). More particularly, the present invention relates to methods and apparatus for efficiently and effectively controlling the orderly decrease or increase of a CBSD's power transmission level to minimize the impact of power transmission level changes on the quality of service and number of user equipment devices affected by the power transmission level changes.

BACKGROUND OF THE INVENTION

In a Citizens Broadband Radio Service (CBRS) network, Citizens Broadband Radio Service Devices (CBSDs) serve as access points which can support wireless communications with user equipment devices (UEs).

A CBRS network often includes one or more Citizens Broadband Radio Service Devices (CBSDs) with relatively small coverage areas as compared to a macro base station or access point. The CBSDs are used to provide services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network. When a specific amount of spectrum is granted to a particular CBSD with a specific transmission power, the SAS calculates the coverage of this CBSD by using a pre-determined path-loss model. Each SAS provider is free to use a path-loss model that fits itself the best, therefore there is at least 7-10 dB in calculated coverage using different path-loss models. There is currently a technological problem in how to accurately estimate a CBSD's coverage and thereby efficiently allocate resources, e.g., power transmission allocations, that efficiently and effectively utilize the limited frequency spectrum available to the CBRS network. The SAS uses crude power transmission level adjustments to increase the overall efficiency of the use of the CBRS frequency spectrum. While the SAS sends CBSDs transmit power change commands it does not manage how or the timing of implementation of the transmit power changes by the CBSD receiving the commands. The SAS power transmission level change commands to CBSD devices can result in disruptions to large numbers of UEs being serviced by the CBSD and/or the quality of service being provided to the UEs as the CBSD is instructed to change, e.g., decrease its power transmission levels if the transmit power level changes are implemented all at once. If the transmit power change is a significant reduction in transmission power a large number of user equipment devices can be dropped or have their quality of service impacted in such a manner as it appears as if the CBRS network is experiencing a failure. With respect to increases in a CBSD's transmission power level when multiple CBSDs in a cluster or with overlapping coverage areas receive a command to increase transmission power at the same or about the same time, if all CBSDs increase their transmit power by a large amount it can result in unanticipated interference across the CBSDs coverage area once again negatively affecting users of UEs being serviced by the CBSDs and quality of service they are receiving. A large increase in transmission power of a CBSD in a single step can also lead a large number of UE devices coming within coverage range of the CBSD and flooding the CBSD with registration and/or service requests. Furthermore, when multiple CBSDs with overlapping coverage both increase their transmission power levels the UEs within the overlapping coverage can enter into race conditions as to which CBSD the UEs should attach to causing unnecessary wireless traffic and potentially causing unnecessary processing of messages at the CBSDs.

From the above it should be understood that there is a need for new and/or improved methods and apparatus for managing a Citizens Broadband Radio Service Device's transmission power level so that the affect on the quality of service and number of user equipment devices that can be serviced is minimized. Additionally, there is a need for new and/or improved methods and apparatus for efficiently managing CBSD power transmission levels to reduce electromagnetic interference while optimizing the CBSD device's coverage area through the gradual increase or reduction of the CBSD's power transmission levels.

SUMMARY OF THE INVENTION

The present invention relates to methods, apparatus and systems for managing a CBSD's power transmission levels in a CBRS network so that the impact on the quality of service and the number of user equipment devices impacted is minimized. The present invention further relates to how to gradually and in an orderly manner increase and decrease a CBSD's power transmit level in response to SAS power up or power down commands using a power headroom threshold value, a channel quality indicator threshold value and a path loss model provided by the SAS so that impact of the power change commands is directed to cell edge user equipment devices as opposed to cell center user equipment devices. The cell edge user equipment devices being in the best position to be serviced by another CBSD device as power transmission levels are decreased. Various embodiments of the present invention solve one or more of the problems discussed above.

Power headroom is a term used to describe information about how much, if any, transmission power increase is possible at a wireless terminal. The power headroom for terminals or user equipment devices closer to a base station, e.g., CBSD device in a CBRS network, is normally greater than wireless terminals or user equipment devices further from a base station since it is normally possible for a nearby terminal to communicate successfully with a base station using a lower transmission power than the wireless terminal's maximum transmission power. Wireless terminals or user equipment devices report power headroom information to the base station with which it is communicating. Power headroom values range in some wireless systems range from 0 to 23 with a power headroom value of '0' meaning that there is no more uplink power left and a power headroom value of '23' meaning that that there is full power available in uplink. In one or more embodiments of the present invention, the power headroom information received from UEs being serviced by a CBSD are used to identify cell edge UEs that are in the outer region of a CBSD's coverage range based on a power headroom threshold value provided by a SAS to the CBSD.

A channel quality indicator (CQI) is information sent by a user equipment device to a base station to indicate the channel quality to the base station. For example in LTE, a UE device transmits a CQI value between 0 and 15 to the base station. This indicates the level of modulation and coding at which the UE could operate. The higher the number the better the channel quality between the base station and the UE. In one or more embodiments of the present invention, the channel quality indicator values received from UEs being serviced by a CBSD are used to identify cell edge UEs that are in the outer region of a CBSD's coverage range based on a channel quality indicator threshold value provided by a SAS to the CBSD.

A demodulation reference signal (DMRS) is an uplink transmission signal sent from a UE device to a base station, e.g., CBSD, typically used for channel estimation and for coherent demodulation. In the present application, the demodulation reference signal information is used to calculate a UE's distance from a base station, e.g., CBSD, using a path loss model identified or supplied by an SAS.

A path loss model is an equation that describes the reduction in power density of an electromagnetic wave, e.g., a wireless signal, as it propagates through space. Path loss of wireless transmissions may be due to many effects, such as free-space loss, refraction, diffraction, reflection, aperture-medium coupling loss, and absorption. Path loss is also influenced by terrain contours, environment (urban or rural, vegetation and foliage), propagation medium (dry or moist air), the distance between the transmitter and the receiver, and the height and location of antennas.

Various embodiments of the present invention utilize user equipment device power headroom information, channel quality indicator information and/or demodulated reference signals received from UEs being serviced by a CBSD to determine an amount of transmit power by which to decrease the CBSD's transmit power in response to a power down command received from a Spectrum Access System until the CBSD's transmit power has been changed to a level which satisfies the power down command received by the CBSD from the Spectrum Access System.

By using one or more of the techniques described herein a Citizens Broadband Radio Service Device can gradually change its transmit power in accordance with received Spectrum Access System power change commands in such a manner that the negative effects of the power changes especially transmit power reductions, e.g., service being discontinued, quality of service being reduced, are minimized and primarily effect the CBSD's edge cell UEs.

In an exemplary method embodiment, a CBSD is operated to: (i) receive from a Spectrum Access System (SAS) one or more of: (a) a power headroom threshold value used to identify cell edge user equipment devices (UEs) or (b) a channel quality indicator threshold value used to identify cell edge user equipment devices; receive a power down command from the SAS; (ii) identify based on one or more of the received power headroom threshold value and the received channel quality indicator threshold value cell edge UEs being serviced by the CBSD; and (iii) decrease transmit power of the CBSD by an estimated amount of transmit power required to support the identified cell edge UEs.

In some embodiments, the CBSD is further operated to receive from the SAS at least one of: a minimum time duration for statistics calculations with regard to a UE or a minimum number of samples to be used for statistics calculations with regard to the UE.

In some embodiments, the CBSD is further operated to receive signals from individual UEs, said received signals from individual UEs including, on a per UE basis, one or more of: UE power headroom information, UE channel quality indicator information and a UE demodulation reference signal. The CBSD determining from the received signals, for each of a plurality of UEs being serviced by the CBSD, one or more of: i) a UE power headroom value or ii) a UE channel quality indicator value. The UE power headroom value for an individual UE may be, and in some embodiments is, an average (e.g., weighted average) power headroom value generated from multiple signals received from the individual UE to which the UE power headroom value corresponds. The UE channel quality indicator value for an individual UE may be, and in some embodiments is, an average (e.g., weighted average) channel quality indicator value generated from multiple signals received from the individual UE to which the UE channel quality indicator value corresponds.

In some embodiments of the present invention, the method step of identifying cell edge UEs being serviced by the CBSD includes at least one of: i) identifying UEs with a channel quality indicator value below said channel quality indicator threshold value as cell edge UEs; and ii) identifying UEs with a power headroom value below said power headroom threshold value as cell edge UEs. In some other embodiments, the step of identifying cell edge UEs being serviced by the CBSD includes: identifying UEs with both i) a channel quality indicator value below said channel quality indicator threshold value as cell edge UEs and ii) a power headroom value below said power headroom threshold value as cell edge UEs.

The CBSD may, and in most embodiments does receive, a path loss model from the SAS for calculating distance to a UE. The CBSD is then able to determine an average distance to the cell edge UEs based on the path loss model and the received signals from the identified cell edge UEs. After an average distance to the cell edge UEs has been determined, the CBSD is operated to estimate an amount of transmit power required to support the identified cell edge UEs based on the number of identified cell edge UEs and an amount of transmit power required to transmit to a UE at the average distance to the cell edge UEs. After decreasing the transmit power of the CBSD by the estimated amount of transmit power required to support the identified cell edge UEs, the CBSD is operated to determine if the transmit power has been changed by an amount which satisfies the power down command. If the transmit power has been changed by an amount which satisfies the power down command, the CBSD continues normal operation at the reduced power level. If the transmit power has not been changed by an amount which satisfies the power down command, the CBSD modifies at least one of the channel quality indicator threshold value or the power headroom threshold value used to identify cell edge UEs and waits until the amount of time or the number of samples required to be collected before identifying cell edge UEs has expired before performing an additional cell edge UE identification operation, determining an additional amount of power by which to reduce the CBSD transmit power and decreasing the CBSD's transmit power. The process being repeated until the CBSD's transmit power satisfies the power down command received by the CBSD from the SAS.

The present invention is applicable to apparatus and system embodiments wherein one or more devices implement the steps of the method embodiments. In some apparatus embodiments each of the CBSDs, user equipment devices, SAS devices and each of the other apparatus/devices of the system include one or more processors and/or hardware circuitry, input/output interfaces including receivers and transmitters, and a memory. The memory including instructions which when executed by one or more of the processors control the apparatus/device of the system to operate the system to perform the steps and/or functions of various method embodiments of the invention.

The present invention is also applicable to and includes apparatus and systems such as for example, apparatus and systems that implement the features and/or steps of the method embodiments. For example, a Citizens Broadband Radio Service Device (CBSD) in accordance with one embodiment of the present invention includes: one or more processors that operate the CBSD to: receive from an SAS, at the CBSD, one or more of i) a power headroom threshold value used to identify cell edge user equipment devices (UEs) or ii) a channel quality indicator threshold value used to identify cell edge user equipment devices (UEs); and receive a power down command from the SAS; identify based on one or more of the received power headroom threshold value and the received channel quality indicator threshold value cell edge UEs being serviced by the CBSD; and decrease transmit power of the CBSD by an estimated amount of transmit power required to support the identified cell edge UEs.

In some embodiments the one or more processors further operate the CBSD to: receive from the SAS at least one of: a minimum time duration for statistics calculations with regard to a UE or a minimum number of samples to be used for statistics calculations with regard to the UE.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
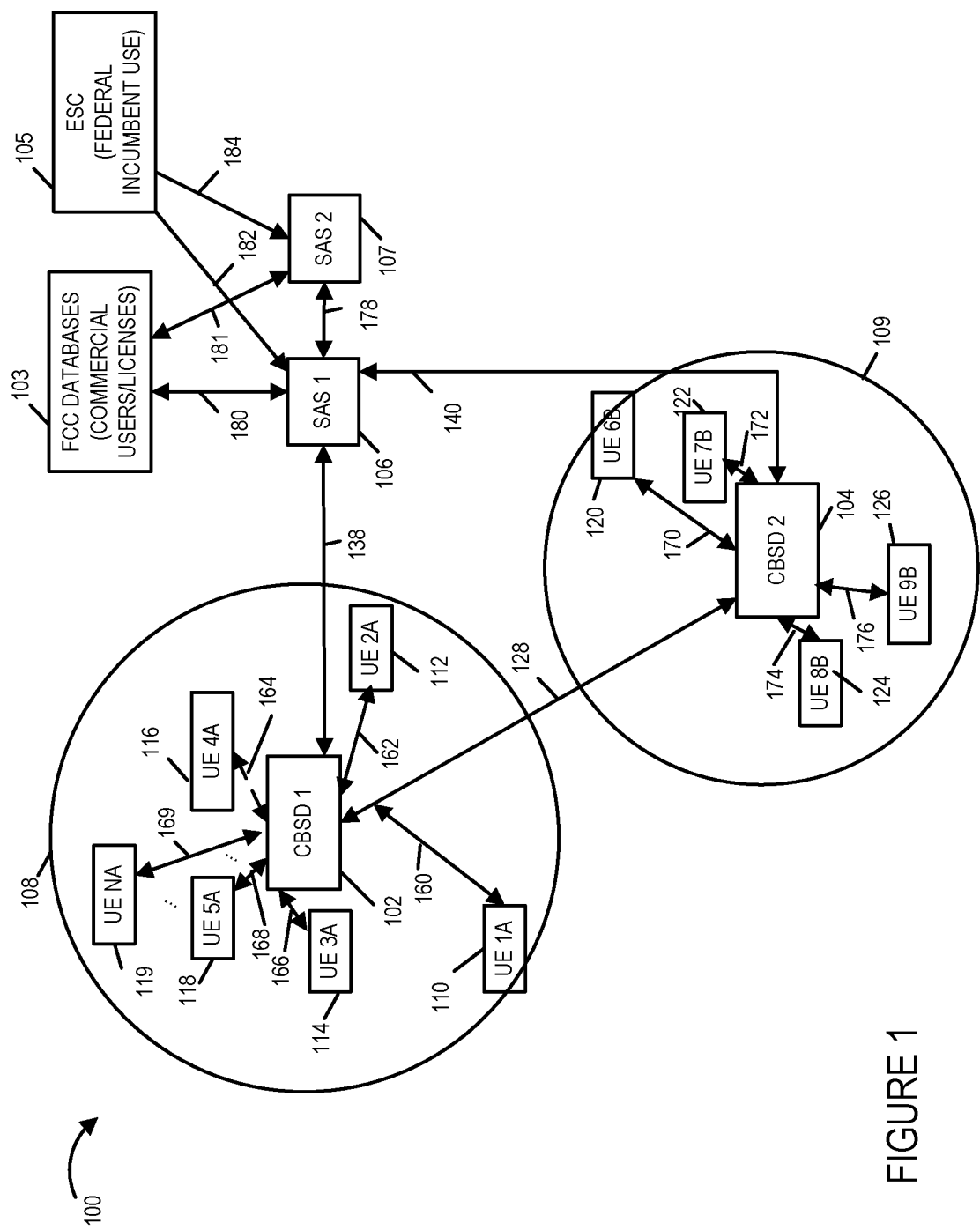
FIG. 1 illustrates an exemplary Citizens Broadband Radio Service network system 100 that provides wireless communications services in accordance one embodiment of the present invention.

The current invention is applicable to Citizens Broadband Radio Service (CBRS) networks that provide wireless communications services. The present invention relates to methods, systems and apparatus to manage, implement and control the reduction or increase in transmission power from a Citizens Broadband Radio Service Device (CBSD) in response to Spectrum Access System power change commands, e.g., commands to increase or decrease the CBSD's transmission power level. The CBSD uses demodulation reference signal information, power headroom information, and/or channel quality indicator information received from user equipment devices (UEs) attached to the CBSD to gradually reduce and/or increase the CBSDs transmit power so as to reduce and/or minimize the impact and/or affect on the UEs attached to the CBSD thereby providing a better experience for the users of the UE devices.

Citizens Broadband Radio Service networks are networks that include user equipment devices, e.g., mobile or wireless devices such as for example cell phones, smart phones, laptops, tablets, drones, Citizens Broadband Radio Service Devices (CBSDs) which serve as access points/base stations, and Spectrum Access Systems which provide spectrum assignments and manage frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSD's power transmission levels in a geographical area the SAS manages the radio interference in the geographical area.

Various embodiments of the present invention describe methods, apparatus, systems and techniques for managing the power transmission levels for a Citizens Broadband Radio Service Device in a CBRS network for example by a Spectrum Access System and efficiently and effectively adjusting a CBSD's power transmission level in response to power change commands received from an SAS while minimizing the impact on service provided to user equipment devices (UEs) attached to the CBSD. Various embodiments use reported user equipment device power headroom information and/or channel quality indicator information along with user equipment demodulation reference signal information and power loss model(s) identified or supplied by the SAS. In various embodiments, statistical analysis is performed on user equipment device power headroom values, channel quality indicator values and/or demodulation reference signal values to determine the amount of transmit power change to implement so that the CBSD's transmit power is gradually increased or decreased to meet the requirements of the SAS power up or down instructions while minimizing the impact on the CBSD's user equipment devices. The reduction or increase in transmit power affecting the UE's on the cell edge of the CBSD's coverage area in an orderly manner as power is increased or decreased in steps.

FIG. 1 illustrates an exemplary CBRS network communications system 100 having an architecture implemented in accordance with the present invention. The CBRS communications network system 100 includes a Citizens Broadband Radio Service Device (CBSD) 1 102, a CBSD 2 104, a Spectrum Access System device 1 (SAS 1) 106, a SAS 2 107, an FCC Databases of commercial users/licenses 103, an Environmental Sensing Capability (Federal Incumbent Use) (ESC) system 105, a plurality of user equipment (UE) devices UE 1A 110, UE 2A 112, UE 3A 114, UE 4A 116, UE 5A 118, . . . , UE NA 119, UE 6B 120, UE 7B 122, UE 8B 124, and UE 9B 126, communications links 128, 138, 140, 160, 162, 164, 166, 168, . . . , 169, 170, 172, 174, 176, 178, 180, 181, 182, 184, a first cell 108 and a second cell 109.

The first cell 108 of the CBRS network is serviced by CBSD 1 102. The first cell 108 illustrates the wireless coverage range of CBSD 1 102 at a first time T1. A plurality of user equipment devices also sometimes referred to as user terminal devices UE 1A 110, UE 2A 112, UE 3A 114, UE 4A 116, UE 5A 118, . . . , UE NA 119 where N is an integer greater than 5 are located in the first cell 108 are in active wireless communications with CBSD 1 102 that is they are attached to CBSD 1 102, e.g., these UEs are being serviced by CBSD 1 102. Communications links 160, 162, 164, 166, 168, . . . , 169 illustrate wireless communications channels, e.g., radio channels, over which CBSD 1 102 and UE 1A 110, UE 2A 112, UE 3A 114, UE 4A 116, UE 5A 118, . . . , UA NA communicate respectively.

The second cell 109 of the CBRS network is serviced by CBSD 2 104. The second cell 109 illustrates the wireless coverage range of CBSD 2 104 at the first time T1. The user equipment devices UE 6B 120, UE 7B 122, UE 8B 124 and UE 9B 126 are located in a second cell 109 and are in communication with CBSD 2 104. Communications links 170, 172, 174 and 176 illustrate wireless communications channels, e.g., radio channels, over which CBSD 2 104 and UE 6 120, UE 7 122, UE 8 124, and UE 9 126 communicate respectively.

SAS 1 106 is coupled to SAS 2 107 via communications link 178. SAS 1 106 is coupled to FCC Databases 103 via communications link 180. SAS 2 107 is coupled to FCC Databases 103 via communications link 181. ESC system 105 is coupled to SAS 1 106 and SAS 2 107 via communications links 182 and 184. The ESC system is used, for among other things, to detect, sense Navy radar operations in CBRS operation within 3550-3650 MHz near the coasts and provide notifications over the communications links to SAS 1 106 and SAS 2 107. SAS 1 106 manages the CBSD 1 102 and CBSD 2 104 spectrum allocation and transmission power to limit interference in the CBRS network. SAS 2 107 manages other CBSDs in the CBRS network which are not shown in FIG. 1. SAS 1 106 and SAS 2 107 communicate and share information regarding the CBRS network coverage of the CBSDs each respectively manage and coordinate management of the allocation of spectrum and power transmission levels of CBSDs throughout the CBRS network. While only two SAS devices are shown in FIG. 1 it should be understood that additional SAS devices are typically used in the CBRS network. The communications link 128 couples CBSD 1 102 to CBSD 2 104.

The communications links 128, 138, 140, 178, 180, 181, 182, and 184 are typically wired communications links or fiber optic cables. The communications links 160, 162, 164, 166, 168, . . . , 169, 170, 172, 174 and 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active CBSD devices, two SAS devices and a few UE devices, it will be appreciated that system 100 typically includes a large plurality of active CBSDs in the CBRS network supporting a large plurality of UE devices and being managed by a plurality of SAS devices which are in communication with one another.

Figure 2:
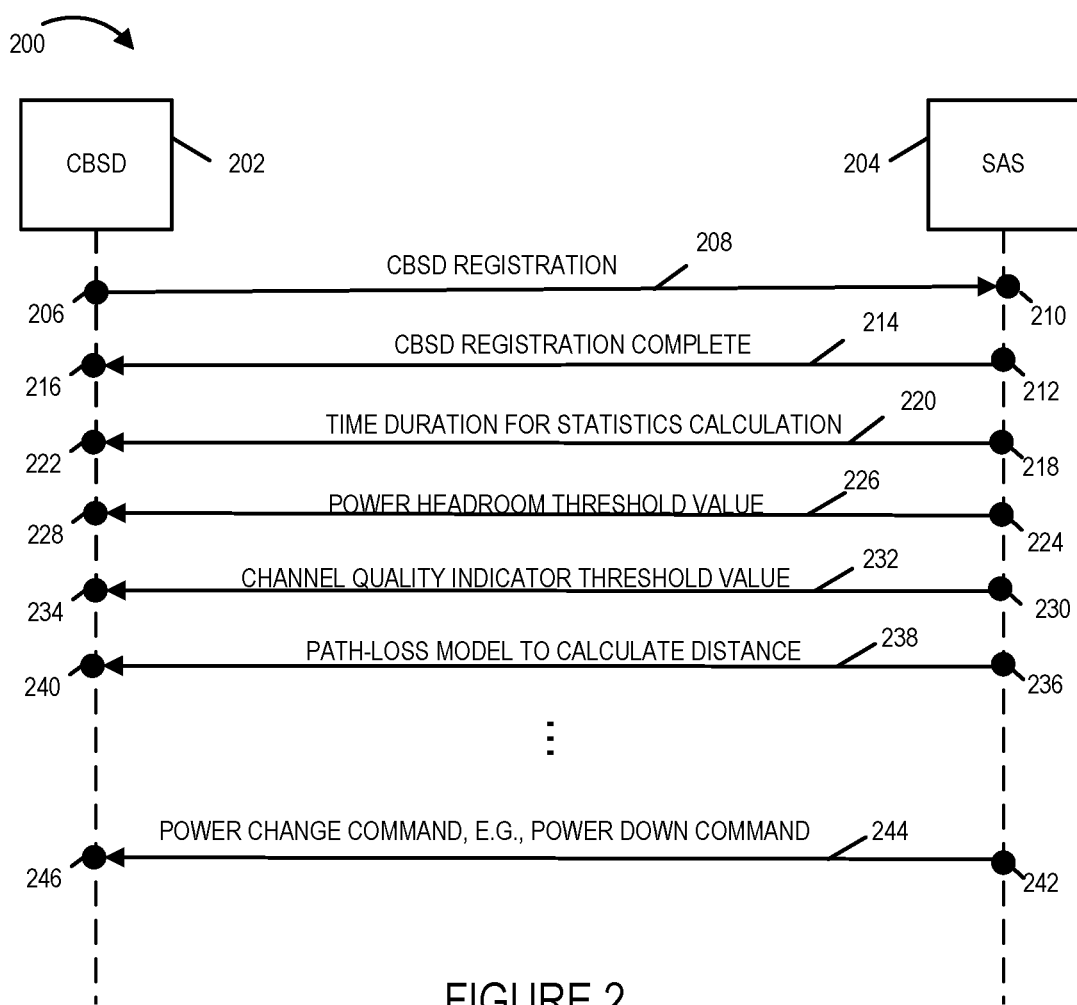
FIG. 2 illustrates an exemplary method and signaling diagram in accordance with an aspect of the present invention.

FIG. 2 is a simplified signaling diagram 200 illustrating the steps of a portion of a method in accordance with the present invention. The signaling diagram 200 illustrates the steps, messages and signaling in which a CBSD, e.g., CBSD 1 102, registers with an SAS, e.g., SAS 1 106 of a CBRS network and as part of the registration or attachment phase receives parameters, data, and/or information to be used by the CBSD to manage power transmission changes requested or commanded by the SAS and during normal operation of the CBSD receives a power change command to be implemented by the CBSD. Time progresses downward in the signaling diagram. While it will be appreciated that additional signaling may be, and typically is, required for a CBSD registration with the SAS, the simplified diagram focuses on the signals used in one or more embodiments of the present invention. The exemplary signaling method 200 may be implemented on the exemplary CBRS network system 100 illustrated in FIG. 1 although it should be understand that the method may be implemented using other systems and other system configurations then those illustrated in FIG. 1.

In step 206, the CBSD 202, e.g., CBSD 1 102 of system 100, generates and transmits CBSD registration message 208 to SAS 204, e.g., SAS 1 106 of system 100, to register with the SAS 204. Operation proceeds from step 206 to step 210.

In step 210, the SAS 204 receives the CBSD registration request message 208 and registers CBSD 202 in the CBRS network. Operation proceeds from step 210 to step 212.

In step 212, SAS 204 generates and transmits a CBSD registration complete or acknowledgement message to CBSD 202 acknowledging that the CBSD has been successfully registered. Operation proceeds from step 212 to step 216.

In step 216, the CBSD 202 receives and processes the CBSD registration complete/acknowledgement message 214 from SAS 204. Operation proceeds from step 216 to step 218.

In step 218, the SAS 204 generates and transmits to the CBSD 202 a time duration for statistics calculation message 220 which includes a predefined time duration value for calculating statistics to be used by CSBD 202 in managing power changes or adjustments to the CBSD's transmission power level in response to power change commands received from the SAS 204. In some embodiments, the SAS 204 in addition to or in place of the time duration for statistics calculation value transmits a minimum number of user equipment samples value indicating the minimum number of UE samples to be collected for use in calculating statistics to be used by CBSD 202 to manage the power changes or adjustments to the CBSD's transmission power level in response to power change commands received from the SAS 204. The time duration parameter and minimum number of user equipment samples parameter are parameters that are used to ensure that a sufficient amount of UE data has been acquired for the statistics calculations to be meaningful. Operation proceeds from step 218 to step 222.

In step 222, the CBSD 202 receives and processes the time duration for statistics calculation message 220 and stores in memory the time duration value and/or the minimum number of UE samples value included in the message. Operation proceeds from step 222 to step 224.

In step 224, the SAS 204 generates and transmits a power headroom threshold value message 226 which includes a power headroom threshold value to be used in managing CBSD power transmission level adjustments or changes, e.g., in response to power down commands from the SAS 204. Operation proceeds from step 224 to step 228.

In step 228, the CBSD 202 receives and processes the power headroom threshold value message 226 and stores in memory power headroom threshold value included in the message. Operation proceeds from step 228 to step 230.

In step 230, the SAS 204 generates and transmits a channel quality indicator threshold value message 232 which includes a channel quality indicator threshold value to be used in managing CBSD power transmission level adjustments or changes, e.g., in response to power down commands from the SAS 204. Operation proceeds from step 230 to step 234.

In step 234, the CBSD 202 receives and processes the power channel indicator threshold value message 232 and stores in memory the channel quality indicator threshold value included in the message. Operation proceeds from step 234 to step 236.

In step 236, the SAS 204 generates and transmits a path-loss model to calculate distance message 238 which includes a path-loss model identifier and/or a path-loss model formula or equation to be used in managing CBSD power transmission level adjustments or changes, e.g., in response to power down commands from the SAS 204. When the path-loss model identifier is included the identifier identifies a path-loss model stored in memory or accessible to the CBSD that is to be used in managing CBSD power transmission level adjustments or changes. In some embodiments, parameters for the path-loss model are also included in the path-loss model message 238 or sent in additional messages to the CBSD 202. In some embodiments in which the path-loss model is already known to the CBSD 202, parameters for use in the path-loss model are transmitted to the CBSD 202 from the SAS 204. The path-loss model is used to calculate the average distance of cell edge UEs from the CBSD 202 as will be explained in detail below. Operation proceeds from step 236 to step 240.

In step 240, the CBSD 202 receives and processes the path-loss model to calculate distance message 238 and stores in memory the path-loss model identifier and/or path loss model included in the message along with any path-loss model parameter values provided. Operation proceeds from step 240 to step 242.

In most embodiments, the time duration for statistics calculation message 220, the power headroom threshold value message 226, the channel quality indicator threshold value message 232 and path-loss model to calculate distance message 238 are communicated to the CBSD 202 from the SAS 204 during the CBSD registration or attach phase when the CBSD 202 registers with SAS 204. In some embodiments, instead of sending individual messages with the information and values, the information and values are grouped and transmitted in one or more messages. For example, the time duration value, power headroom threshold value, channel quality indicator threshold value and path-loss model identifier may be, and in some embodiments are, sent in a single message transmitted from the SAS 204 to the CBSD 202 during the registration or attachment of the CBSD 202 to the SAS 204. In some embodiments, each of the items, i.e., values, information, identifier or model, is included in a separate field of a single message that is transmitted to the CBSD 202 from the SAS 204.

After a period of time indicated by the . . . in FIG. 2 when the CBSD 202 is operating in a normal mode of operation as opposed to the registration or attachment phase of operation, the SAS 204 in step 242 generates and transmits a power change command message 244, e.g., a power down command message, to CBSD 202. The SAS 204 may for example issue such a command because it has detected an interference problem with CBSD 202's transmissions and another base station e.g., another CBSD or an LTE base station operating in the CBRS spectrum and needs to reduce the CBSD 202's power transmission level as part of managing the efficient use of the frequency spectrum. In another example, the SAS 204 as part of managing the frequency spectrum may have received a message that there is naval activity to occur in the proximity of the CBSD 202 and needs to reduce the CBSD 202 power transmission level to ensure that it does not interfere with navy transmissions. The power change command may for example be a power down command indicating that CBSD 202 is to reduce its transmission power level by 2 decibels (dBs). Operation proceeds from step 242 to step 246.

In step 246, the CBSD 202 receives the power change command message 244 from the SAS 204 and processes the power change command message 244. In response to the power change command received from the SAS 204, the CBSD 202 undertakes operations to change its transmission power level in accordance with the received power change command.

An exemplary embodiment to reduce transmit power of CBSD in response to an SAS power down command which uses the power headroom threshold value (PHTHS), channel quality indicator threshold value (CQITHS), the time duration for statistics calculation and path-loss model provided by the SAS to the CBSD during the registration or attachment phase will now described. The CBSD has all power headroom (PH) and channel quality indicator (CQI) information for each user equipment device (UE) in its coverage. The CBSD divides the network into two sections for the duration of its operation. Based on the pre-defined PHTHS value that is sent from the SAS to the CBSD during the CBSD registration or attachment phase, the CBSD ranks the UEs to which it is providing service and creates "cell center" and "cell edge" areas. The cell being the area of coverage over which the CBSD provides service to UEs. The "cell center" area will include UEs which have power headroom values higher than or equal to the power headroom threshold value provided by the SAS. The "cell edge" area include UEs which have power headroom values lower than the power headroom threshold value provided by the SAS. These regions are referred to as "power headroom based regions". There is also a pre-defined CQI threshold value (CQITHS) which is shared by the SAS with the CBSD during CBSD device registration or attachment phase. "CQI Cell edge" area will include UEs which have values lower than the CQI threshold value and "CQI cell center" areas will include UEs which have CQI values higher than or equal to the CQI threshold value.

The CBSD calculates the number of UEs in both the "cell center" and "cell edge" areas for the duration of the pre-defined time based on the PH threshold value and the CQI threshold value and power headroom and channel quality indicator values reported to the CBSD from the UEs. The pre-defined time value being a time duration value sent from the SAS during the CBSD device registration or attachment phase. The CBSD uses areas with a lower number of UEs calculated using the power headroom based method and channel quality indicator based method. The CBSD uses the demodulation reference signal received from all UEs falling into the cell edge areas to calculate the average distance of these UEs based on the path-loss model provided by the SAS to the CBSD during the CBSD device registration or attachment phase. The CBSD then calculates how much transmit power is required to cover, i.e. provide service, to the UEs in the cell edge areas. The calculated transmit power value is the value that is to be used to reduce the CBSD transmit power in the first step of a potentially multiple step process for gradually reducing the CBSD's transmit power when commanded to reduce power by the SAS. That is, when the CBSD is instructed to power down by the SAS, the first power reduction value, is this calculated transmit power to cover the cell edge UEs. If the final transmit power value after reduction is equal to or less than the transmit power value sent from the SAS in the power down instruction, then the CBSD will stop and not calculate the next power reduction value. If the final transmit power value after the reduction of transmit power is higher than the transmit power value sent from the SAS, the CBSD will calculate the next set of "cell edge" and "cell center" UEs. CBSD will calculate the distance to the cell edge UEs based on the demodulated reference signal values from the cell edge UEs using the path-loss model and then calculate the transmit power reduction value to uncover only the identified cell edge UEs. The CBSD will then decrease its transmit power by the calculated transmit power reduction value and test whether the CBSD transmit power level now satisfies the transmit power level requirements provided by the SAS. The CBSD repeats this process until its transmit power level is reduced to meet the transmit power level in the SAS power down command. In some embodiments, the SAS power down command provides a transmit power level while in other embodiments, it provides an amount of transmit power reduction, e.g., a transmit power reduction of 2 dB.

Figure 3A:
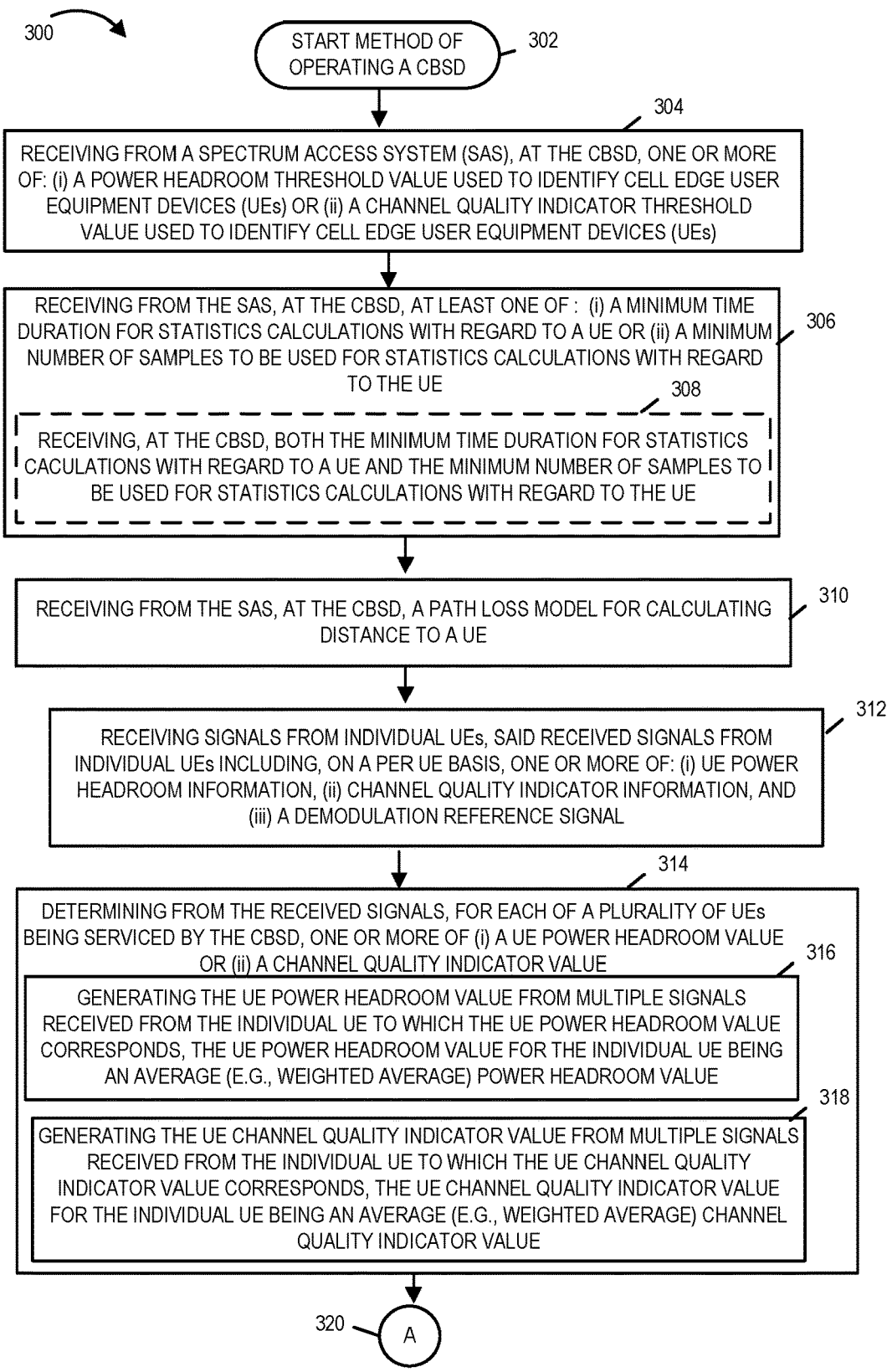
FIG. 3A illustrates the steps of the first part of an exemplary method in accordance with one embodiment of the present invention.
Figures 3, 3A, 3B, 3C:
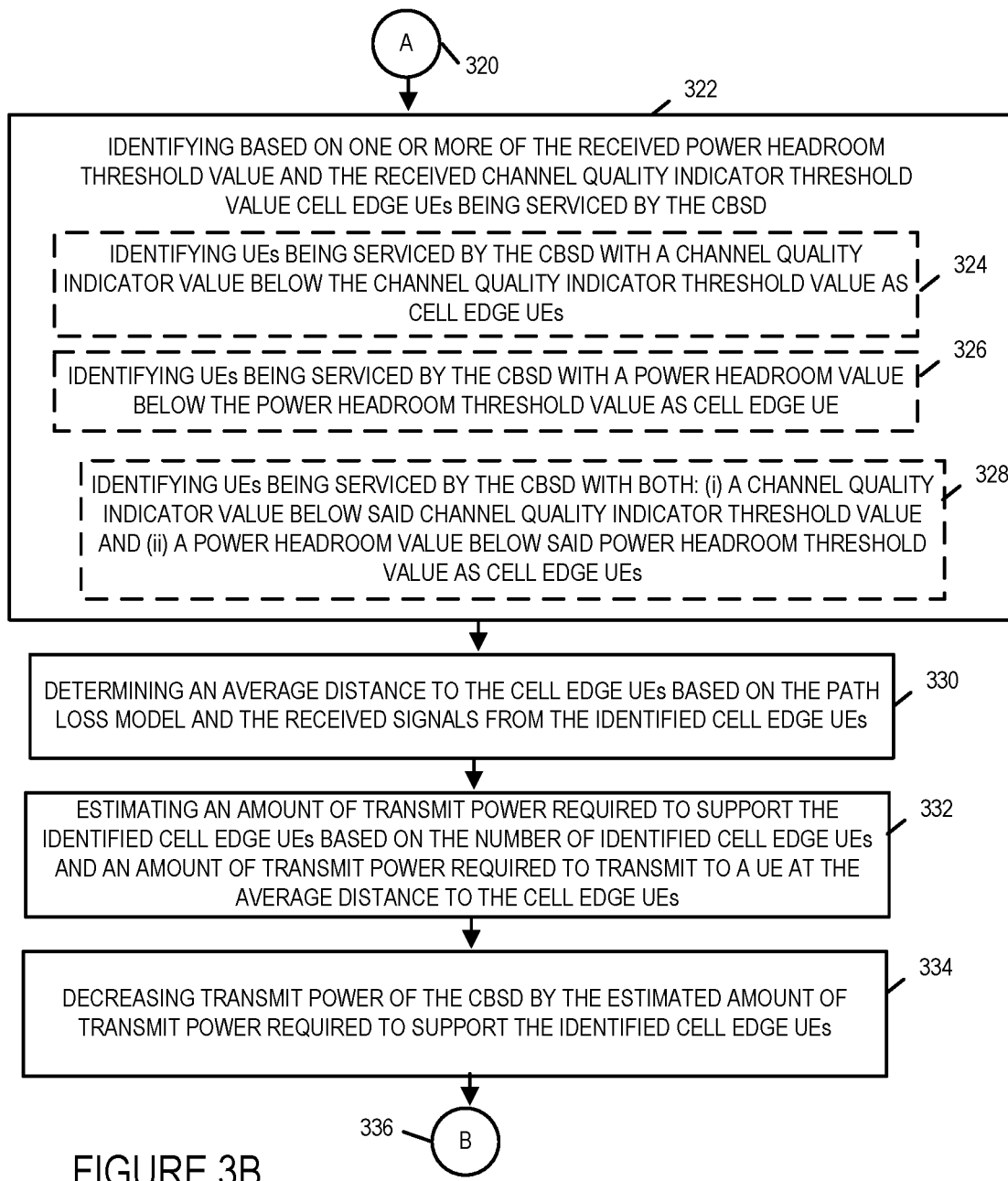
FIG. 3 illustrates the combination of FIGS. 3A, 3B and 3C.
FIG. 3B illustrates the steps of the second part of an exemplary method in accordance with one embodiment of the present invention.
FIG. 3C illustrates the steps of the third part of an exemplary method in accordance with one embodiment of the present invention.
Figure 3C:
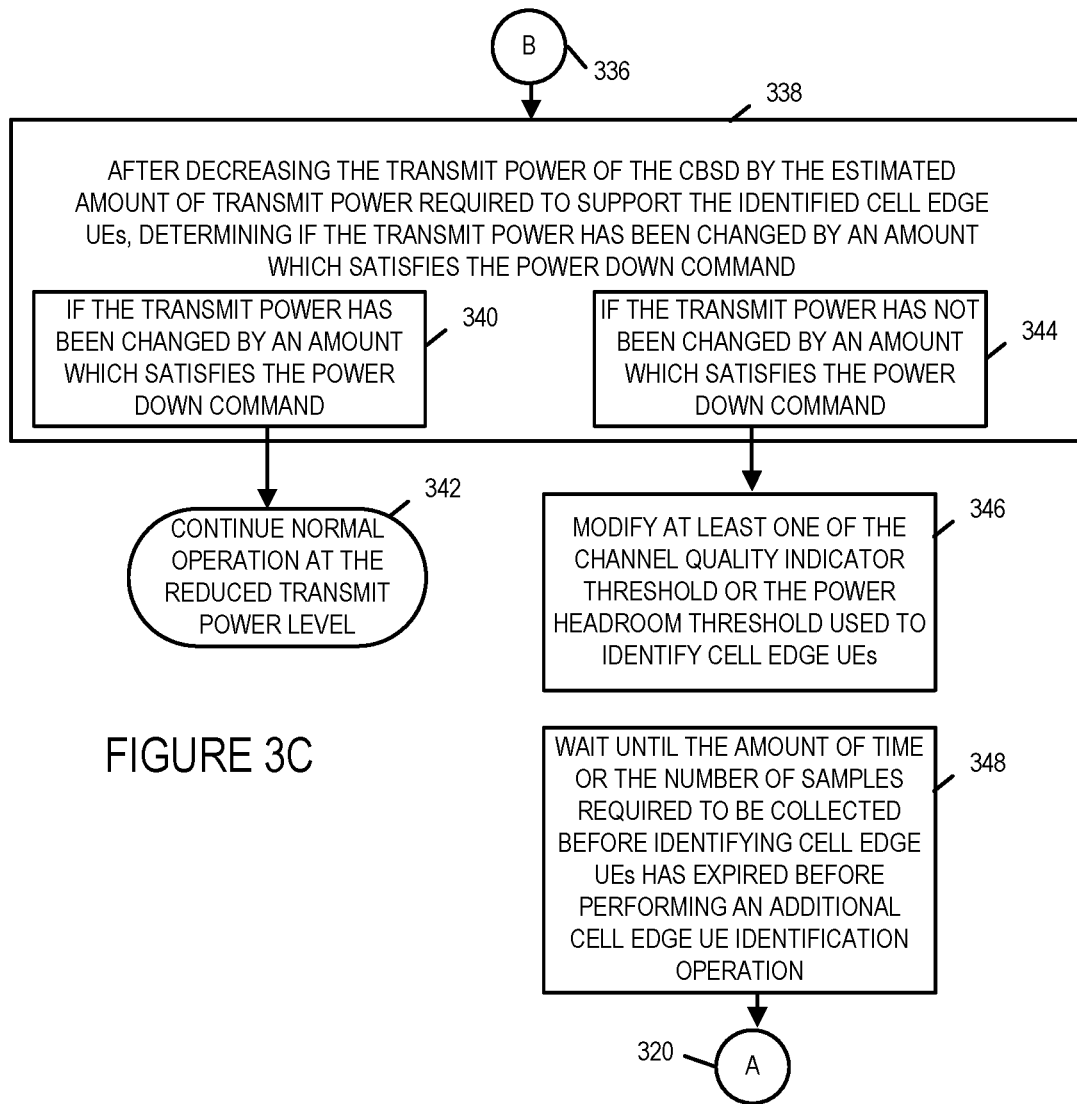

FIG. 3 is a flow chart illustrating an exemplary method 300 of operating a Citizens Broadband Radio Service Device (CBSD) in accordance with the present invention. The method 300 illustrates how a CBSD gradually reduces power after receiving a power down change command from an SAS so as to reduce and/or minimize service interruptions of UEs attached to the CBSD and allow for the orderly reduction of power without interrupting service for all UEs attached or being serviced by the CBSD. FIG. 3 illustrates the combination of FIGS. 3A, 3B and 3C. FIG. 3A illustrates the steps of the first part of an exemplary method 300 in accordance with one embodiment of the present invention. FIG. 3B illustrates the steps of the second part of an exemplary method 300 in accordance with one embodiment of the present invention. FIG. 3C illustrates the steps of the third part of an exemplary method 300 in accordance with one embodiment of the present invention.

For explanatory purposes the exemplary method 300 will be explained in connection with the exemplary CBRS network system 100 illustrated in FIG. 1 although it should be understand that the method may be implemented using other systems and other system configurations then those illustrated in FIG. 1.

The method 300 shown in FIG. 3 will now be discussed in detail. The method starts in start step 302 shown on FIG. 3A with the devices in system 100 being initialized and becoming operational.

The method 300 of operating a CBSD starts in start step 302. Operation proceeds from start step 302 to step 304.

In step 304, the CBSD, e.g., CBSD 1 102, receives from a Spectrum Access System (SAS), e.g., SAS 1 106, at the CBSD, one or more of (i) a power headroom threshold value used to identify cell edge user equipment devices (UEs) or (ii) a channel quality indicator threshold value used to identify cell edge user equipment devices (UEs). Operation proceeds from step 304 to step 306.

In step 306, the CBSD receives from the SAS, at the CBSD, at least one of: (i) a minimum time duration for statistics calculations with regard to a UE or (ii) a minimum number of samples to be used for statistics calculations with regard to the UE. The minimum number of samples and minimum time duration are used to ensure that a statistically significant collection of data has occurred prior to the statistical analysis used to determine an amount of transmit power by which the CBSD will decrease its transmit power. Step 306 in some embodiments includes sub-step 308. In sub-step 308, the CBSD receives both the minimum time duration for statistics calculations with regard to a UE and the minimum number of samples to be used for statistics calculations with regard to the UE. Operation proceeds from step 306 to step 310.

In step 310, the CBSD receives from the SAS a path loss model for calculating distance to a UE. In some embodiments instead of receiving the path loss model the CBSD receives a path loss model identifier and/or parameters for the path loss method. In such embodiments, the CBSD includes one or more path loss models in its memory with associated identifiers or has access to the identified path loss models. The path loss model is a function of the demodulation reference signal in which the demodulation reference signal received from a UE can be used to determine the distance the UE is from the base station. The path loss model may be, and in some embodiments is, tailored to the environment in which the CBSD is located for example a CBSD located in a urban environment may be sent a urban path loss model while a CBSD located in a rural environment may be sent a rural path loss model. Operation proceeds from step 310 to step 312.

In step 312, the CBSD receives signals from individual UEs, said received signals from individual UEs including, on a per UE basis, one or more of: (i) UE power headroom information, (ii) channel quality indicator information, and (iii) a demodulation reference signal. Operation proceeds from step 312 to step 314.

In step 314, the CBSD determines from the received signals, for each of a plurality of UEs being serviced by the CBSD, one or more of: (i) a UE power headroom value or (ii) a channel quality indicator value. In some embodiments, step 314 includes one or more sub-steps 316 and 318. In sub-step 316, the CBSD generates the UE power headroom value from multiple signals received from the individual UE to which the UE power headroom value corresponds, the UE power headroom value for the individual UE being an average (e.g., weighted average) power headroom value. In sub-step 318, the CBSD generates the UE channel quality indicator value from multiple signals received from the individual UE to which the UE channel quality indicator value corresponds. The UE channel quality indicator value for the individual UE being an average (e.g., weighted average) channel quality indicator value. Operation proceeds from step 314 via connection node A 320 to step 322 shown on FIG. 3B.

In step 322, the CBSD identifies based on one or more of the received power headroom threshold value and the received channel quality indicator threshold value cell edge UEs being serviced by the CBSD. In some embodiments, step 324 includes one of sub-steps 324, 326, and 328. In sub-step 324 the CBSD identifies UEs being serviced by the CBSD with a channel quality indicator value below the channel quality indicator threshold value as cell edge UEs. In sub-step 326, the CBSD identifies UEs being serviced by the CBSD with a power headroom value below the power headroom threshold value as cell edge UEs. In sub-step 328, the CBSD identifies UEs being serviced by the CBSD with both: (i) a channel quality indicator value below said channel quality indicator threshold value and (ii) a power headroom value below said power headroom threshold value as cell edge UEs. Operation proceeds from step 322 to step 330.

In step 330, the CBSD determines an average distance to the cell edge UEs based on the path loss model and the received signals from the identified cell edge UEs. For example, the CBSD uses the demodulated reference signals received from the edge cell UEs to determine the average distance to the cell edge UEs using the path loss model. Operation proceeds from step 330 to step 332.

In step 332, the CBDS estimates an amount of transmit power required to support the identified cell edge UEs based on the number of identified cell edge UEs and an amount of transmit power required to transmit to a UE at the average distance to the cell edge UEs. Operation proceeds from step 332 to step 334.

In step 334, the CBSD decreases its transmit power by the estimated amount of transmit power required to support the identified cell edge UEs. Operation proceeds from step 334 via connection node B 336 to step 338 shown on FIG. 3C.

In step 338, the CBSD after decreasing the transmit power of the CBSD by the estimated amount of transmit power required to support the identified cell edge UEs, determines if the transmit power has been changed by an amount which satisfies the power down command received from the SAS.

In sub-step 344, if the transmit power has not been changed by an amount which satisfies the power down command operation proceeds from step 338 to step 346.

In step 346, the CBSD modifies at least one of the channel quality indicator threshold value or the power headroom threshold value used to identify cell edge UEs. Operation proceeds from step 346 to step 348.

In step 348, the CBSD waits until the amount of time or the number of samples required to be collected before identifying cell edge UEs has expired before performing an additional cell edge UE identification operation. The CBSD receives signals from the UEs being serviced by the CBSD during this time period as described in connection with step 312. Operation proceeds from step 348 via connection node A 320 to step 322 and the method proceeds as previously described with the identification of cell edge UEs and average distance to cell edge UEs being based on the additional signals received from the UEs being serviced by the CBSD.

Returning to step 338, in sub-step 340, if the CBSD determines that the transmit power has been changed by an amount which satisfies the received power down command from the SAS, operation proceeds from step 338 to step 342. In step 342, the CBSD continues normal operation at the reduced transmit power level.

Through the method 300, the transmit power of the CBSD is reduced gradually until the transmit power has been reduced by an amount which satisfies the power down command received from the SAS.

Figure 4:
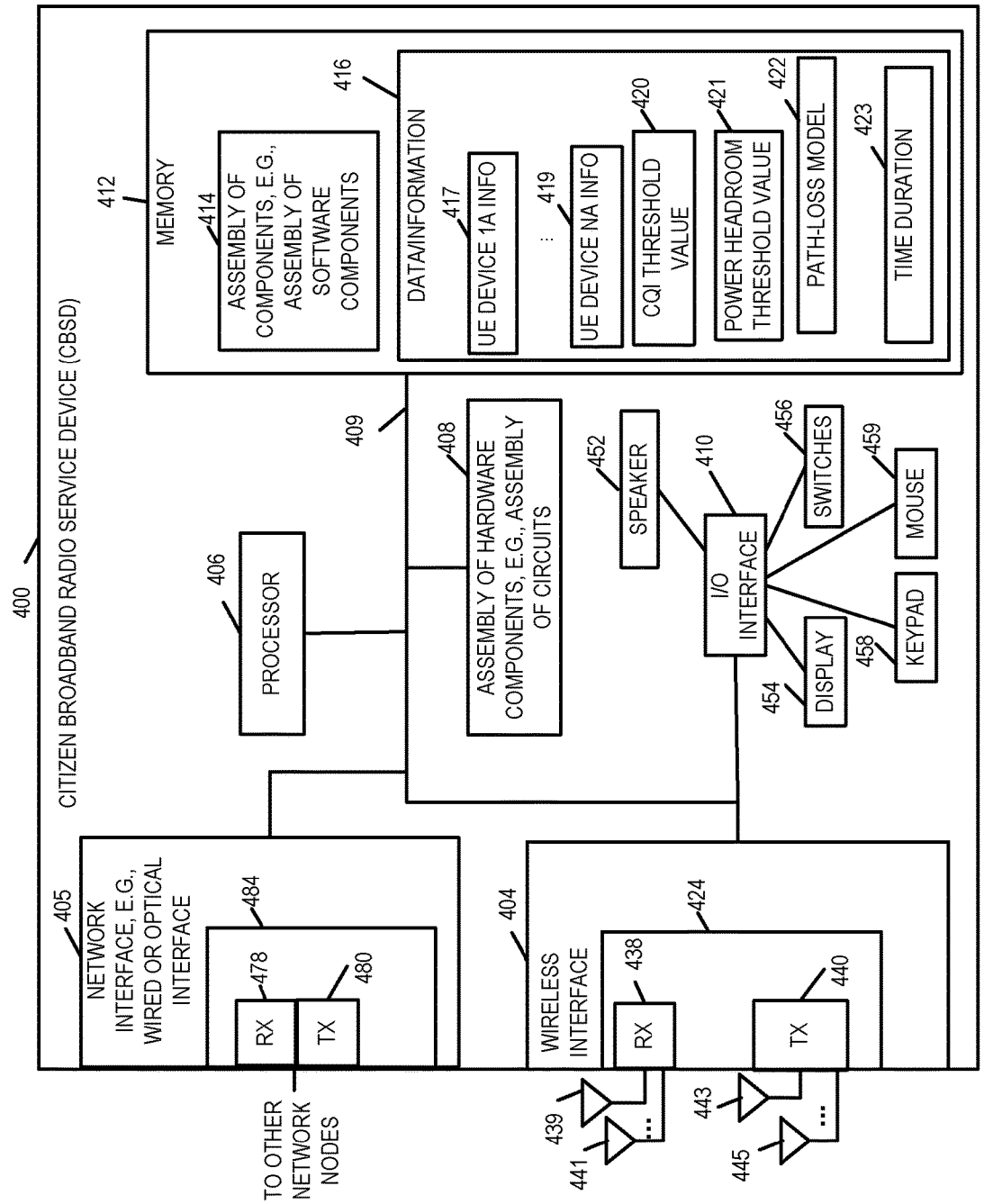
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400, in some embodiments, incorporates Long Term Evolution (LTE), e.g., 4G LTE, eNodeB base station/access point capabilities such as determination of a user equipment device's power headroom values, channel quality indicator values, demodulated reference signal values from signals received from user equipment devices being serviced by the CBSD. The CBSD device 400 also includes the capabilities of a CBSD as defined by the Federal Communications Commission's Rules with Regard to Commercial Operations in the 3550-3650 MHz Band. Exemplary CBSD device 400 includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 4242. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device. Memory 412 includes an assembly of components 414, e.g., an assembly of software components, and data/information 416. Data/information 416 includes UE device information corresponding to a plurality of user equipment devices (UE device 1A information 417, . . . , UE device N information 419 where 1A to NA are the UE devices being serviced by the CBSD for example CBSD 1 102 UE 1A 110 . . . UE NA 119 as shown in FIG. 1 including power headroom values, channel quality indicator values and demodulated reference signal values received from the individual UE, channel quality indicator threshold value 420, the power headroom threshold value 421, path-loss model 422 and time duration for statistics calculation 423. In some embodiments, CBSD 1 102 and/or CBSD 2 104, are implemented in accordance with CBSD 400. In some embodiments, CSBD 202 is implemented in accordance with CBSD 400.

Figure 5:
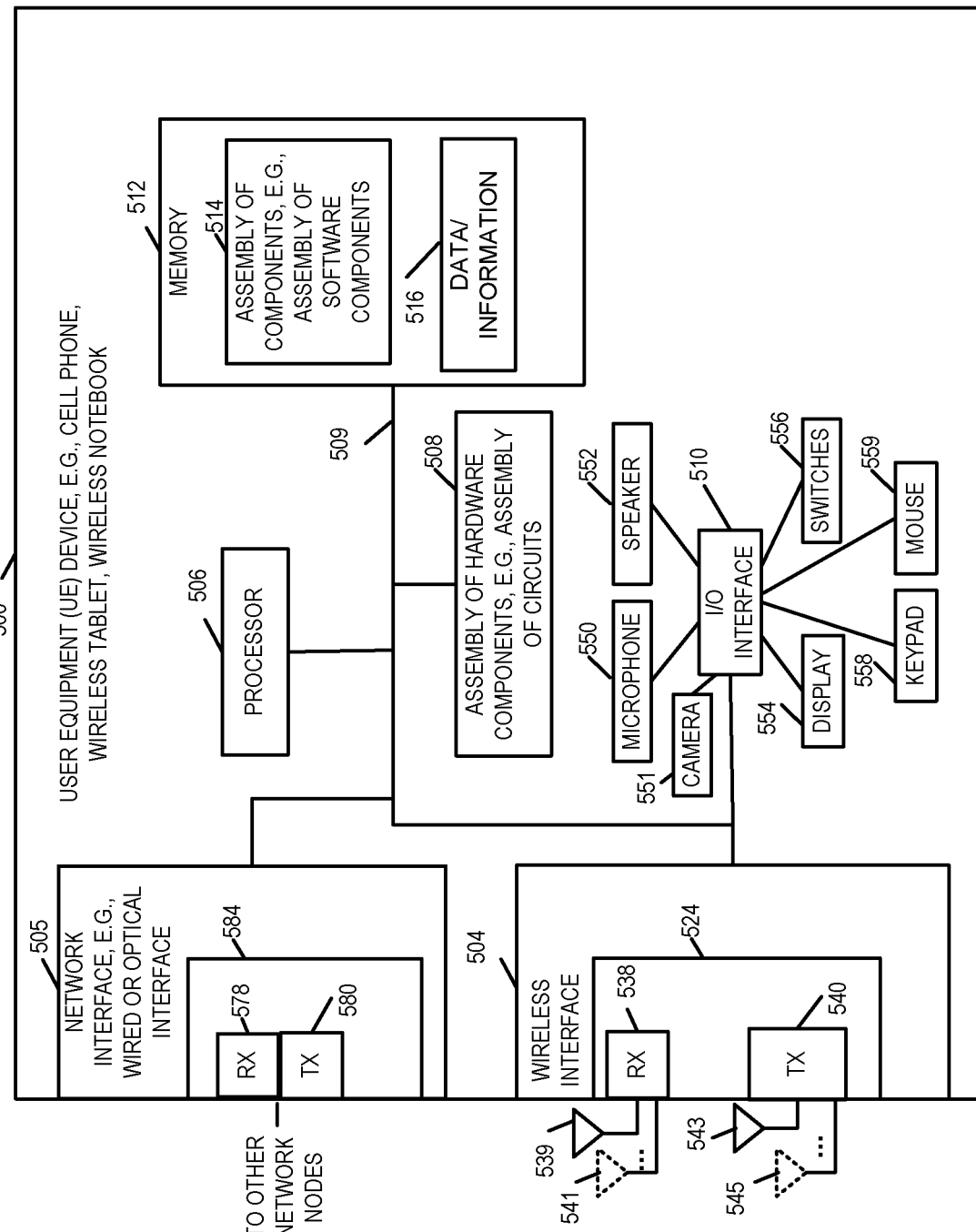
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet, wireless notebook, drone with wireless communications, laptop. UE device 500, in some embodiments, includes Long Term Evolution (LTE), e.g., 4G LTE, mobile device capabilities such as for example generating and sending to a base station, e.g., CBSD, power headroom values, channel quality indicator values, and demodulated reference signals. Exemplary UE device 500 includes a wireless interface 504, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 512 includes an assembly of components 514, e.g., an assembly of software components, and data/information 516. The UE devices in system 100 may be, and in some embodiments are, implemented in accordance with the user equipment device 500.

Figure 6:
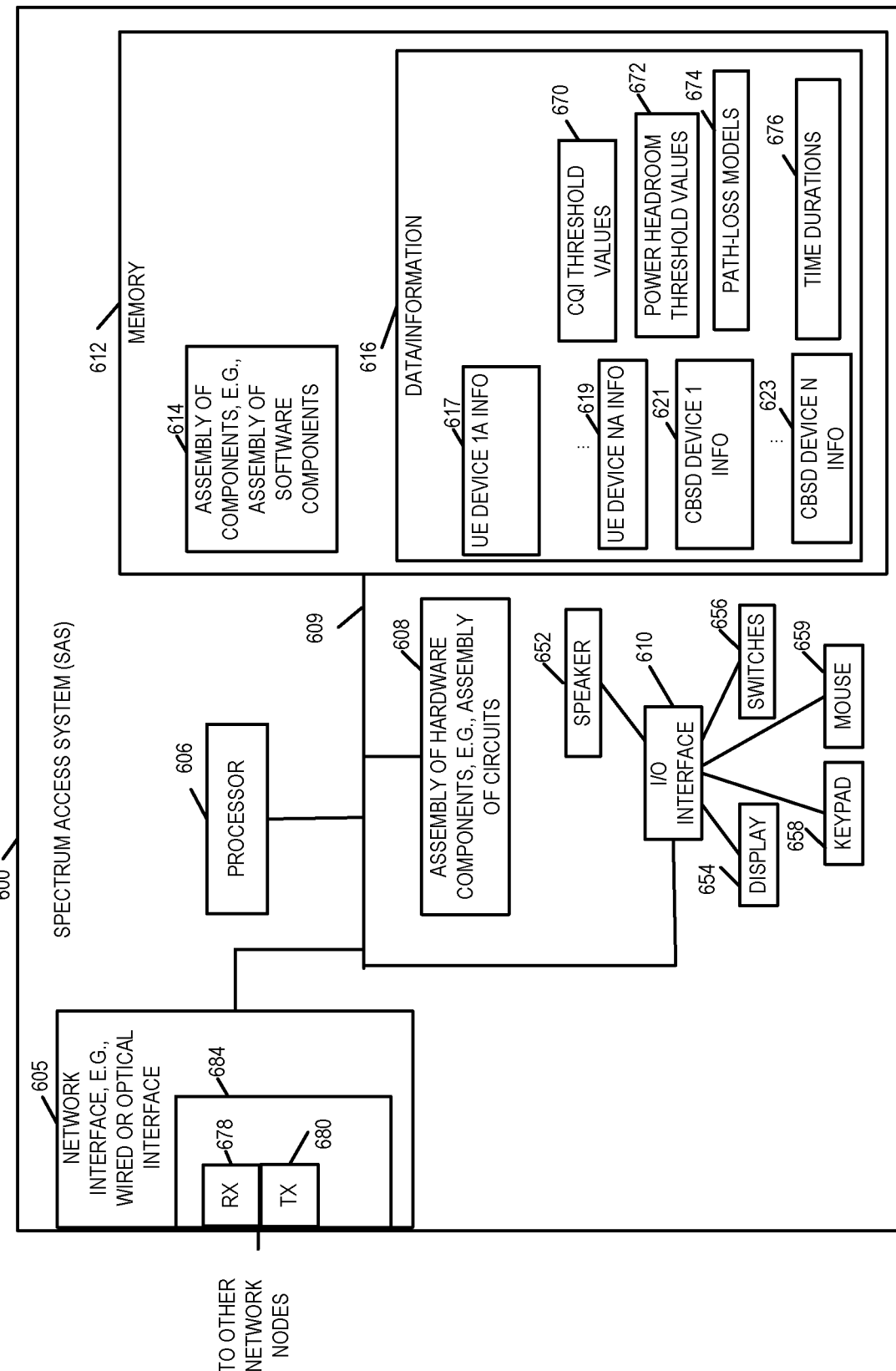
FIG. 6 illustrates details of an exemplary Spectrum Access System device (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 654, switches 656, keypad 658 and mouse 659 coupled to I/O interface 610, via which the various I/O devices (652, 654, 656, 658, 659) may communicate with other elements (605, 606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes UE device information corresponding to a plurality of UE devices (UE device 1A information 617 . . . UE device NA information 619, where N is integer number. Data/information 616 also includes CBSD device information corresponding to a plurality of CBSD devices (CBSD device 1 information 621, . . . , CBSD device N information 623, where N is an integer number). Data/Information 616 also includes channel quality indicator threshold values 670, power headroom threshold values 672, path-loss models 674, and time durations for statistics calculation values 676 and CBDS device transmission power and spectrum allocation information. In some embodiments, SAS 1 106 and SAS 2 108 are implemented in accordance with SAS 600. In some embodiments SAS 204 is implemented in accordance with SAS 600.

Figure 7:
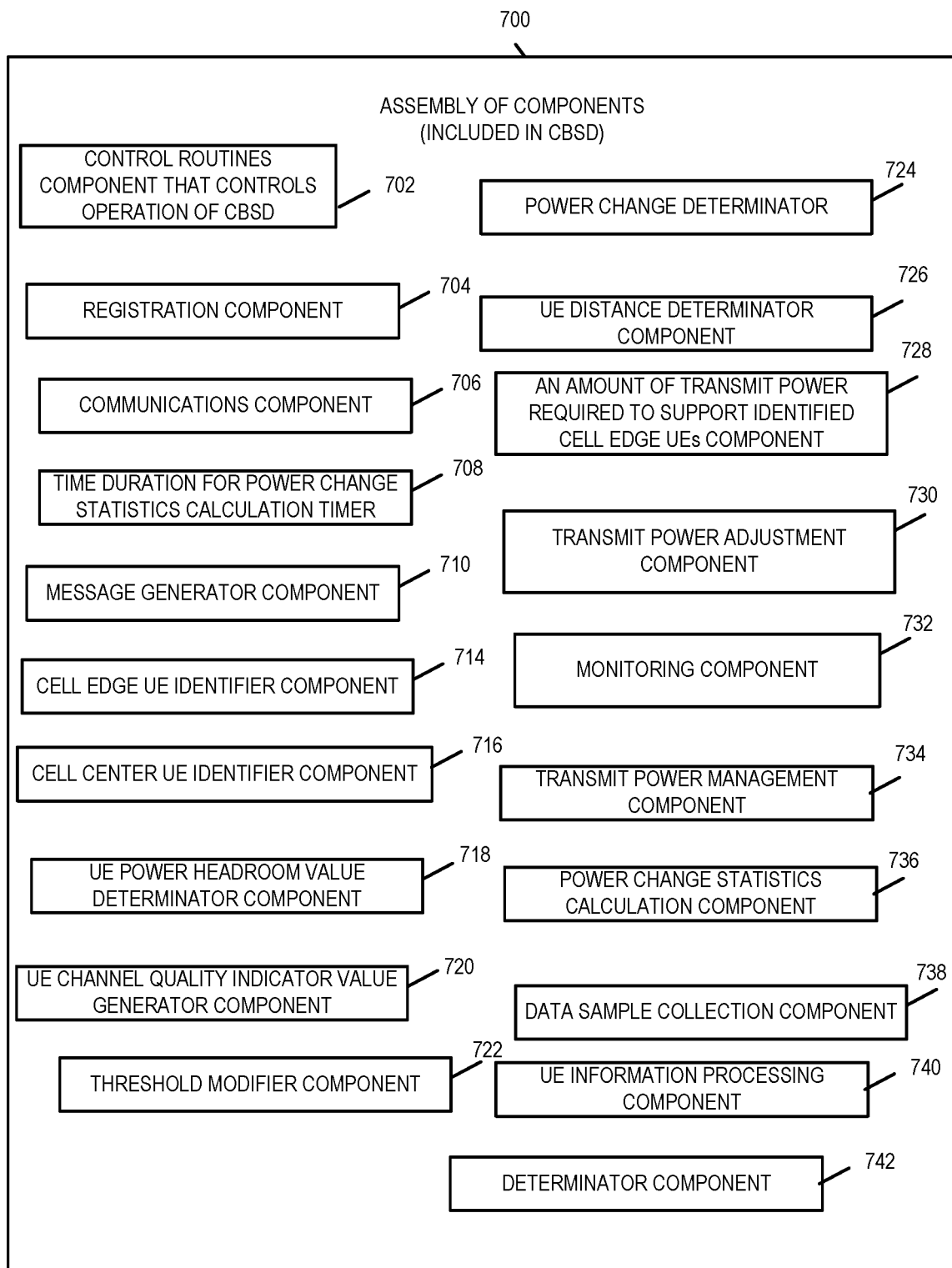
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a registration component 704, a communications component 706, a time duration for power change statistics calculation timer component 708, a message generator component 710, cell edge UE identifier component 714, a cell center UE identifier component 716, a UE power headroom value determinator component 718, a UE channel quality indicator value generator component 720, threshold modifier component 722, a power change determinator component 724, UE distance determinator component 726, an amount of transmit power required to support identified cell edge UEs component 728, a transmit power adjustment component 730, a monitoring component 732, a transmit power management component 734, a power change statistics calculation component 736, a data sample collection component 738, a UE information processing component 740, and a determinator component 742. The control routines component 702 is configured to control operation of the CBSD. The registration component 704 is configured to register the CBSD with a Spectrum Access System. The communication component 706 is configured to handle communications, e.g., transmission, reception, and processing of messages, and protocol signaling for the CBSD. The message generator component 710 is configured to generate messages for transmission to other devices. The cell edge UE identifier component 714 is configured to identify which UEs being serviced by the CBSD are cell edge UEs. The cell center UE identifier component 716 is configured to identify which UEs being serviced by the CBSD are cell center UEs. The UE power headroom value determinator component 718 is configured to determine a UE power headroom value, e.g., an average UE power headroom value corresponding to a UE. The UE channel quality indicator value generator component 720 is configured to generate a UE channel quality indicator value, e.g., an average UE channel quality indicator value corresponding to a UE. The threshold modifier component 722 is configured to modify a UE channel quality indicator threshold value and/or a UE power headroom threshold value. The power change determinator 724 is configured to determine an amount of power by which to increment or decrement the CBSD's transmit power level. The UE distance determinator component 726 is configured to determine the distance of a UE from the CBSD. In some embodiments, the UE distance determinator component 726 is configured to determine the average distance of a cell edge UE from the CBSD based on the path loss model and a determined UE demodulation reference signal or a power level determined from UE demodulation reference signal information. The amount of transmit power required to support identified cell edge UEs component 728 is configured to estimate the amount of transmit power required to support UEs identified by the CBSD as cell edge UEs. The transmit power adjustment component 730 is configured to adjust the transmit power level of the CBSD. The monitoring component 723 is configured to monitor for power change commands from an SAS directed to the CBSD. The transmit power management component 734 is configured to operate and/or control the CBSD to perform operations to effect a change of transmit power in accordance with one or more steps of the methods 200, 300 or 1000. The power change statistics calculation component 736 is configured to perform statistical calculations for use in making transmit power changes at the CBSD. The data sample collection component 738 is configured to collect UE samples, e.g., UE power headroom values, UE channel quality indicator values, and reference demodulation signal values. The UE information processing component 740 processes UE information received from UE devices, e.g., power headroom values, UE channel quality indicator values, and reference demodulation signals. The determinator component 742 is configured to make determinations and/or decisions for the CBSD for example based on received information and/or generated information.

Figure 8:
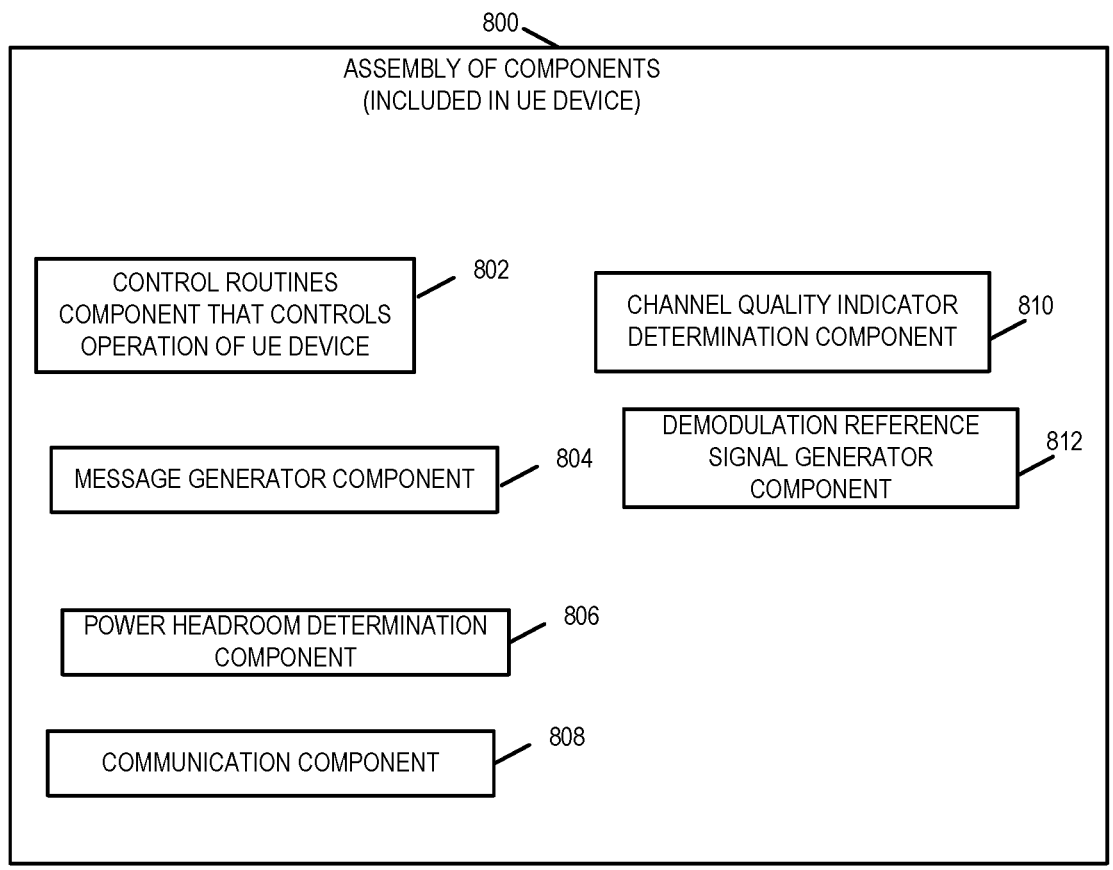
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a power headroom determination component 806, a communication component 808, a channel quality indicator determination component 810 and a demodulation reference signal generator component 812. The control routines component 802 is configured to control operation of the UE. The message generator component 804 is configured to generate messages for transmission to CBSD devices. The power headroom determination component 806 is configured to determine or generate a power headroom value for the user equipment device, e.g., to provide to the CBSD device servicing the UE. The communication component 808 is configured to handle communications, e.g., receipt, transmission and processing of signals and provide protocol signal processing for one or more protocols for the UE. The channel quality indicator determination component 810 is configured to determine or generate a channel quality indicator value for the user equipment device, e.g., to provide to the CBSD device servicing the UE. The demodulation reference signal generator component 810 is configured to generate a demodulation reference signal for the user equipment device, e.g., to provide to the CBSD device servicing the UE.

Figure 9:
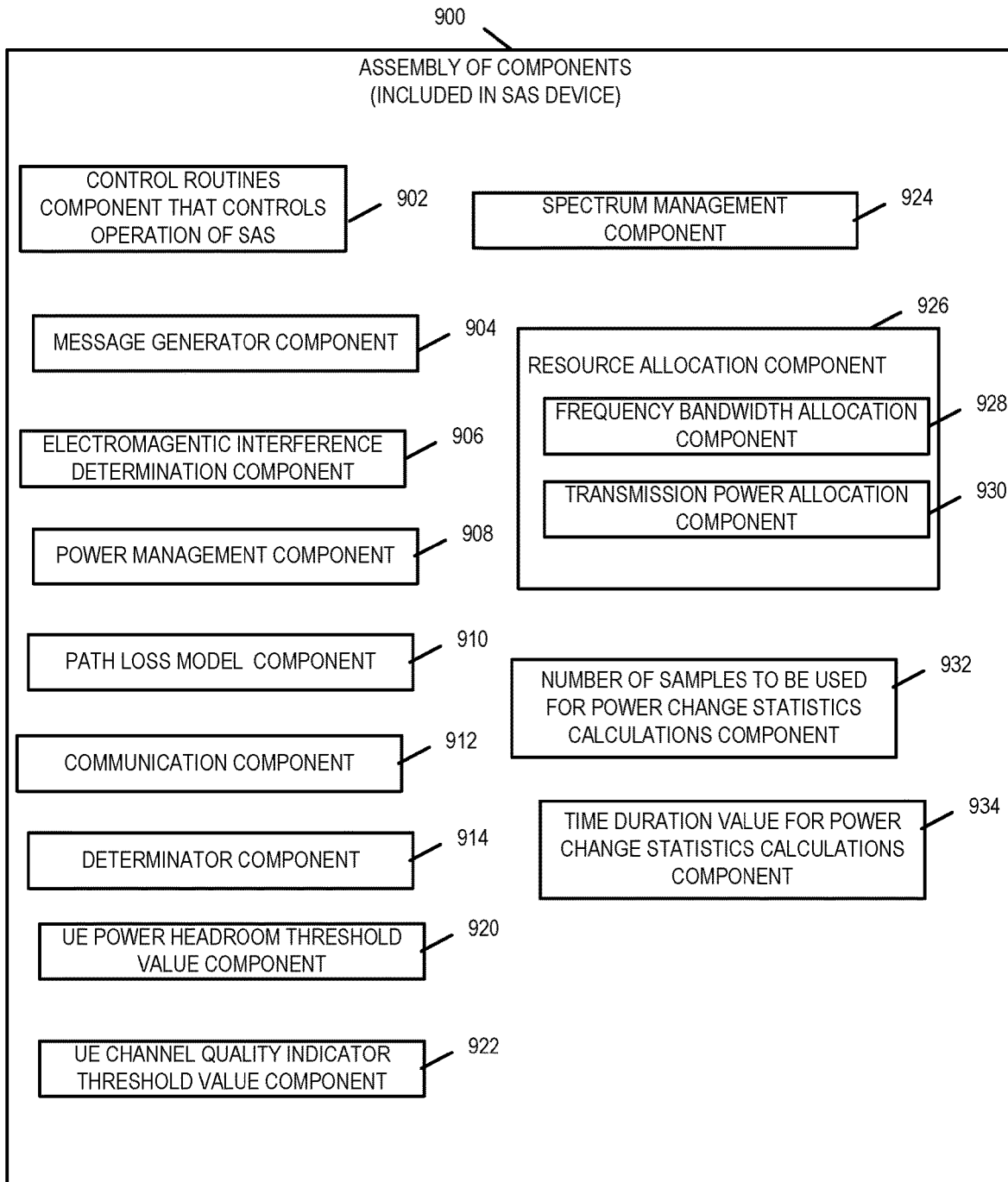
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, a power management component 908, path loss model component 910, communication component 912, determinator component 914, UE power headroom threshold value component 920, UE channel quality indicator threshold value component 922, spectrum management component 924, a resource allocation component 926, a number of samples to be used for power change statistics calculations component 932, and a time duration value for power change statistics calculations component 934. The resource allocation component 926 includes in a frequency bandwidth allocation component 928 and a transmission power allocation component 930. The control routines component 902 is configured to control operation of the SAS. The message generator component 904 is configured to generate messages for transmission to CBSD devices, e.g., resource allocations messages including frequency bandwidth allocated to a CBSD and transmission power allocations for the CBSD, transmit power change commands, registration messages, CQI threshold value to be used by CBSD for identifying cell edge UEs messages, power headroom threshold value to be used by CBSD for identifying cell edge UEs messages, time duration value to be used for collecting information for power change statistics calculations messages, path loss model for calculating UE distance messages, and number of samples, i.e., minimum number of samples, to be used for power change statistics calculations by CBSD. The electromagnetic interference determination component is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference and in some embodiments is a sub-component of the resource allocation component.

The power management component 908 determines the power transmission levels for CBSDs managed by the SAS and in some embodiments are sub-components of the resource allocation component 926. The spectrum management component 924 is configured to manage the allocation of frequency spectrum in the CBRS network including frequency bandwidth allocated to CBSDs managed by the SAS. In some embodiments, the spectrum management component 924 is a sub-component of resource allocation component 926. The communication component 912 is configured to handle communications between the SAS and other nodes, e.g., CBSD device, FCC database, ESC system including receipt and transmission of messages and protocol signaling.

The path loss model component 910 determines the path loss model to send to a CBSD during the registration phase, e.g., based on the location and topology of the geography surrounding the CBSD. The UE power headroom threshold value component 920 determines the UE power headroom threshold value to send to a CBSD to be used to identify cell edge UEs. The UE channel quality indicator threshold value component 922 is configured to determine the UE channel quality indicator threshold value to send to a CBSD to be used to identify cell edge UEs. The number of samples to be used for power change statistics calculations component 932 is configured to determine the minimum number of samples that the CBSD requires to use for power change statistics calculations which is sent to a CBSD. The time duration value for power change statistics calculations component 934 is configured to determine the duration of time that a CBSD should collect UE information, e.g., CQI, power headroom and DMRS information, to use for power change statistics calculations, which is sent to a CBSD.

The determinator component 914 is configured to make one or more decisions or determinations such as for example, determine the path loss model, time duration value, power headroom threshold value, CQI threshold value and power up and power down amount to communicate to a CBSD.

The resource allocation component 926 is configured to allocate resources including for example frequency bandwidth allocations and/or transmission power allocations for CBSDs managed by the SAS. In some embodiments, the resource allocation component 926 includes sub-components frequency bandwidth allocation component 928 and transmission power allocation component 930. The frequency bandwidth allocation component 928 is configured to allocate frequency bandwidth for a CBSD based on the estimated coverage area of the CBSD. The transmission power allocation component 930 is configured to allocate transmission power to a CBSD based on the estimated coverage area of the CBSD and to make power transmit level changes to maximize efficiency of the CBRS network's spectrum.

Figure 10A:
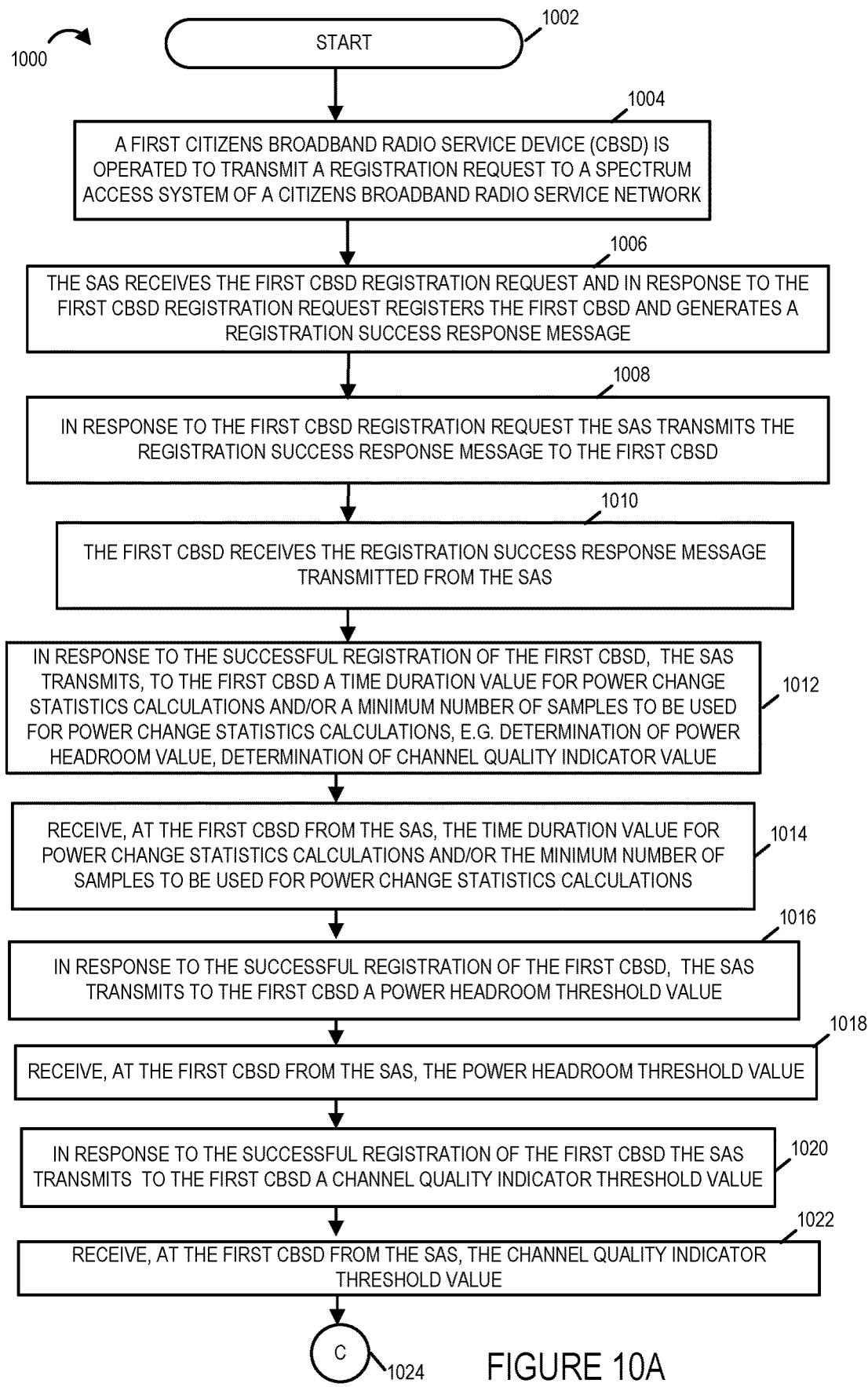
FIG. 10A illustrates the steps of the first part of an exemplary method in accordance with one embodiment of the present invention.
Figure 10B:
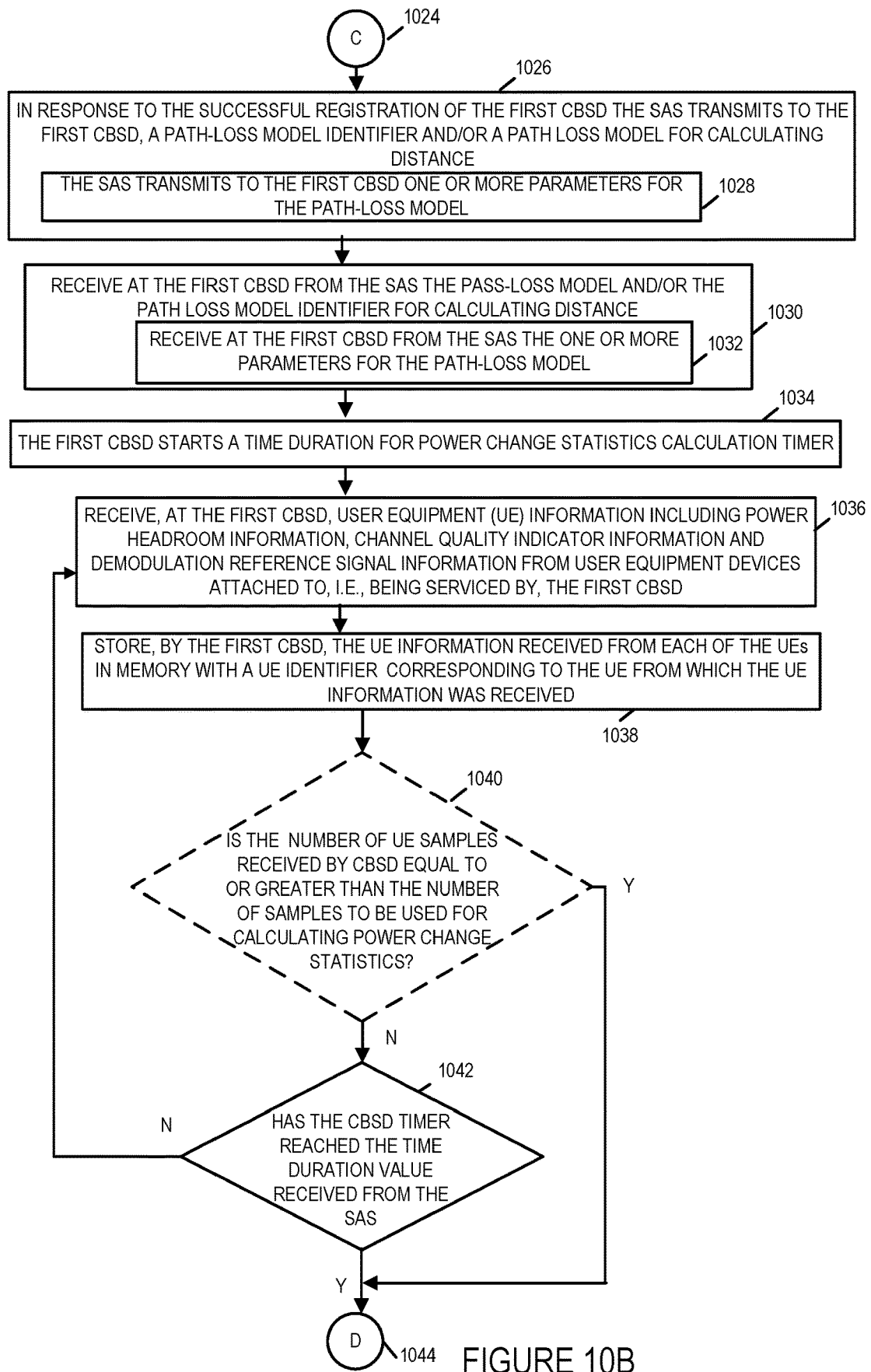
FIG. 10B illustrates the steps of the second part of an exemplary method in accordance with one embodiment of the present invention.
Figure 10C:
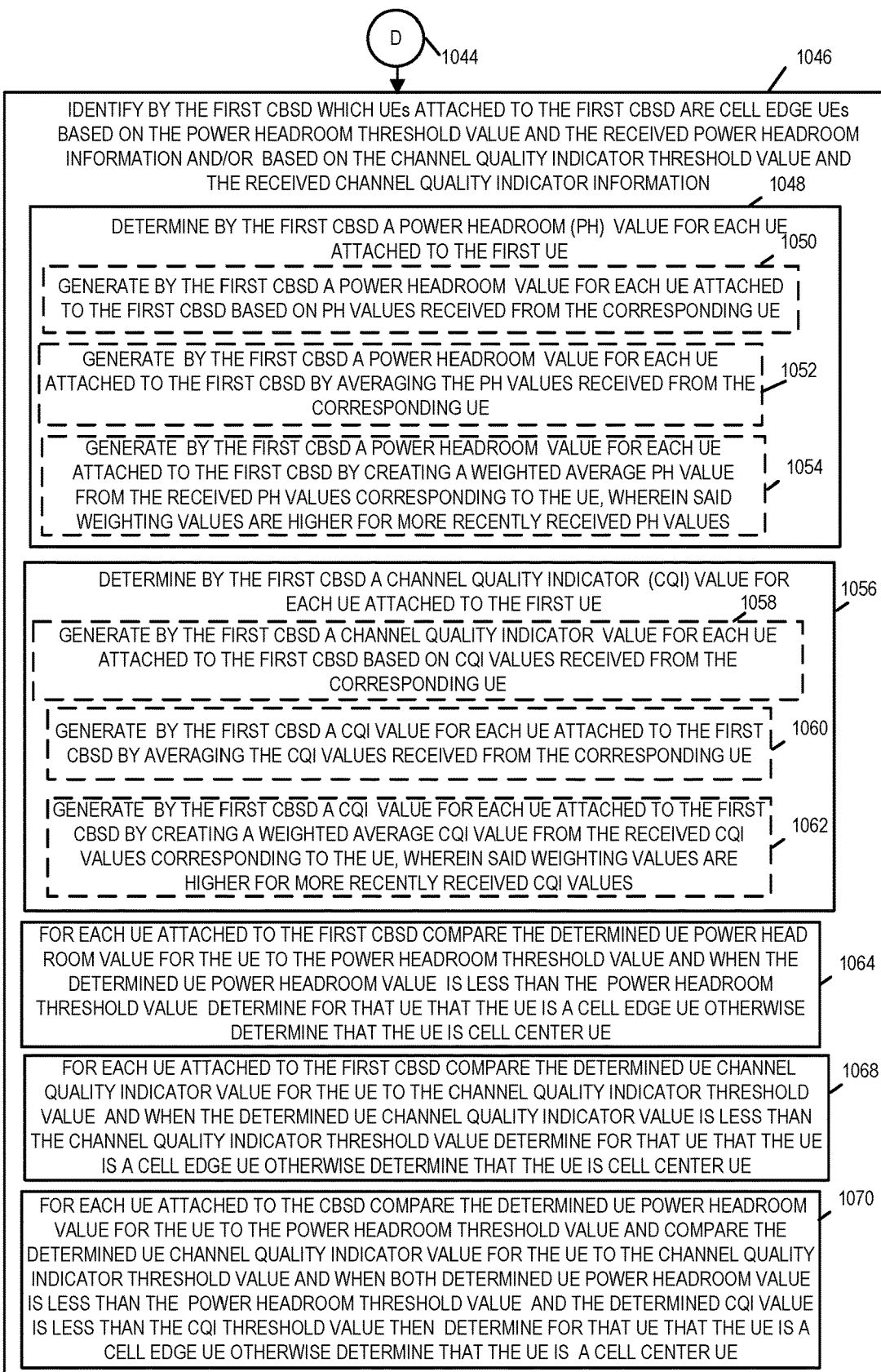
FIG. 10C illustrates the steps of the third part of an exemplary method in accordance with one embodiment of the present invention.
Figure 10D:
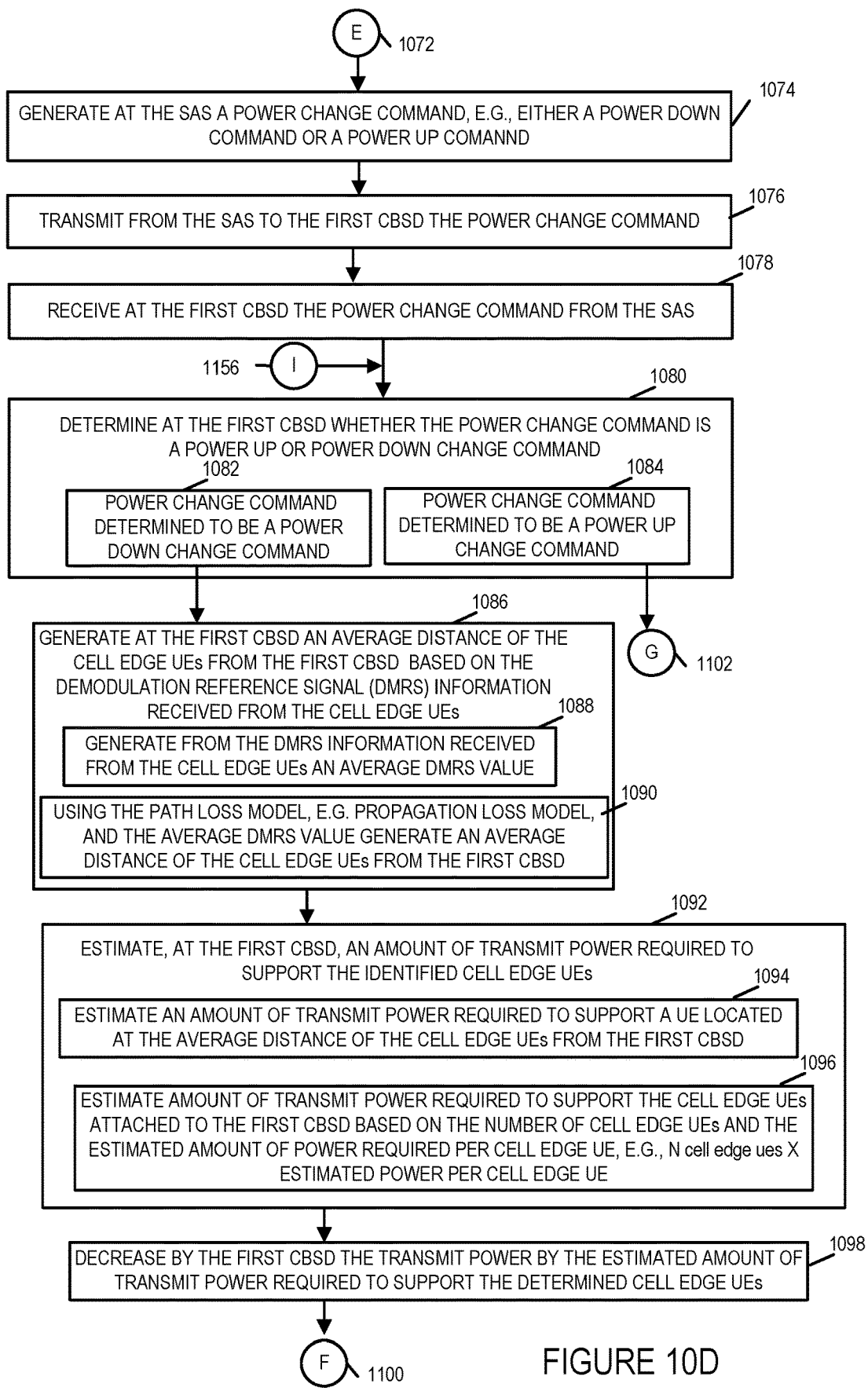
FIG. 10D illustrates the steps of the fourth part of an exemplary method in accordance with one embodiment of the present invention.
Figure 10E:
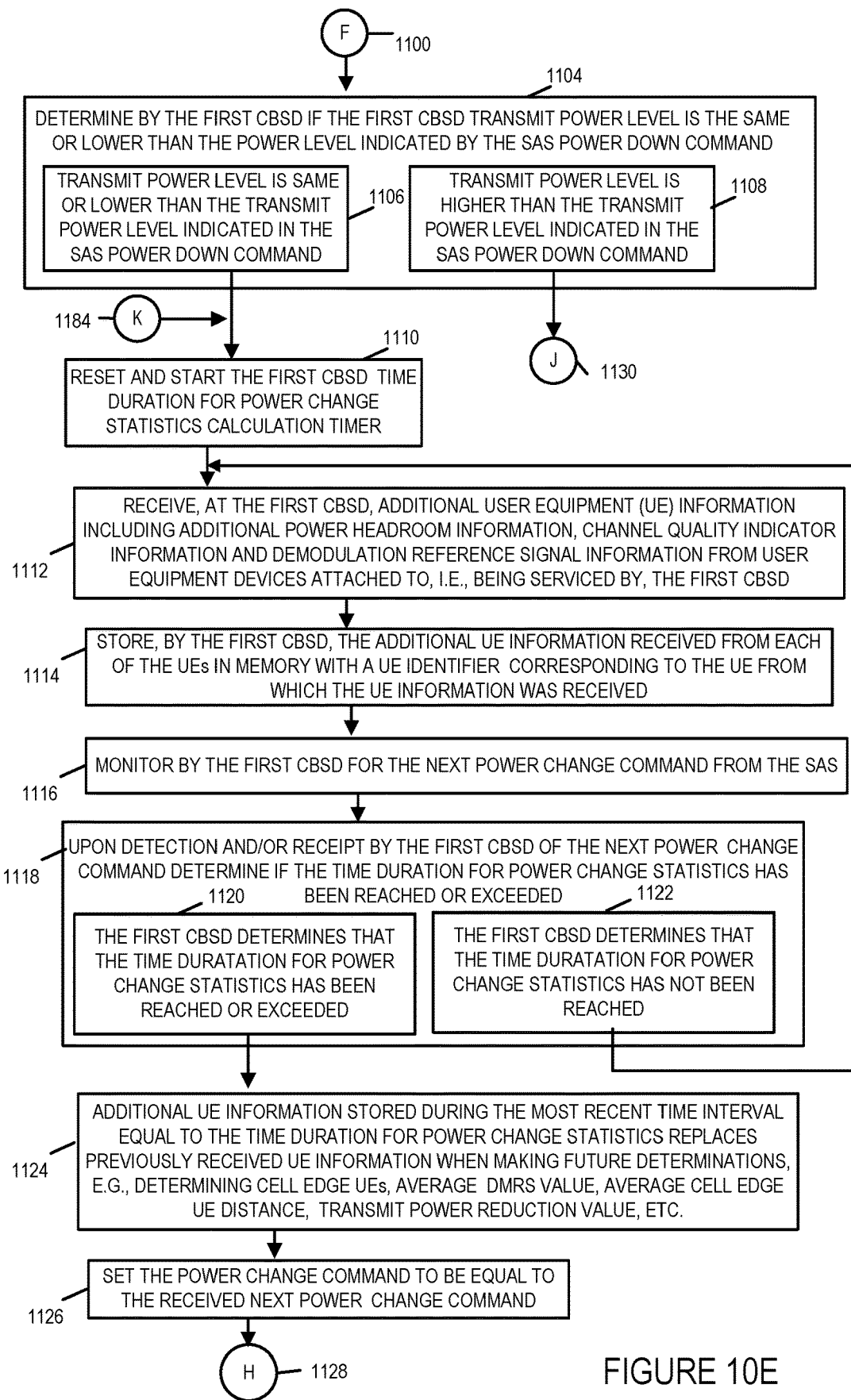
FIG. 10E illustrates the steps of the fifth part of an exemplary method in accordance with one embodiment of the present invention.
Figure 10F:
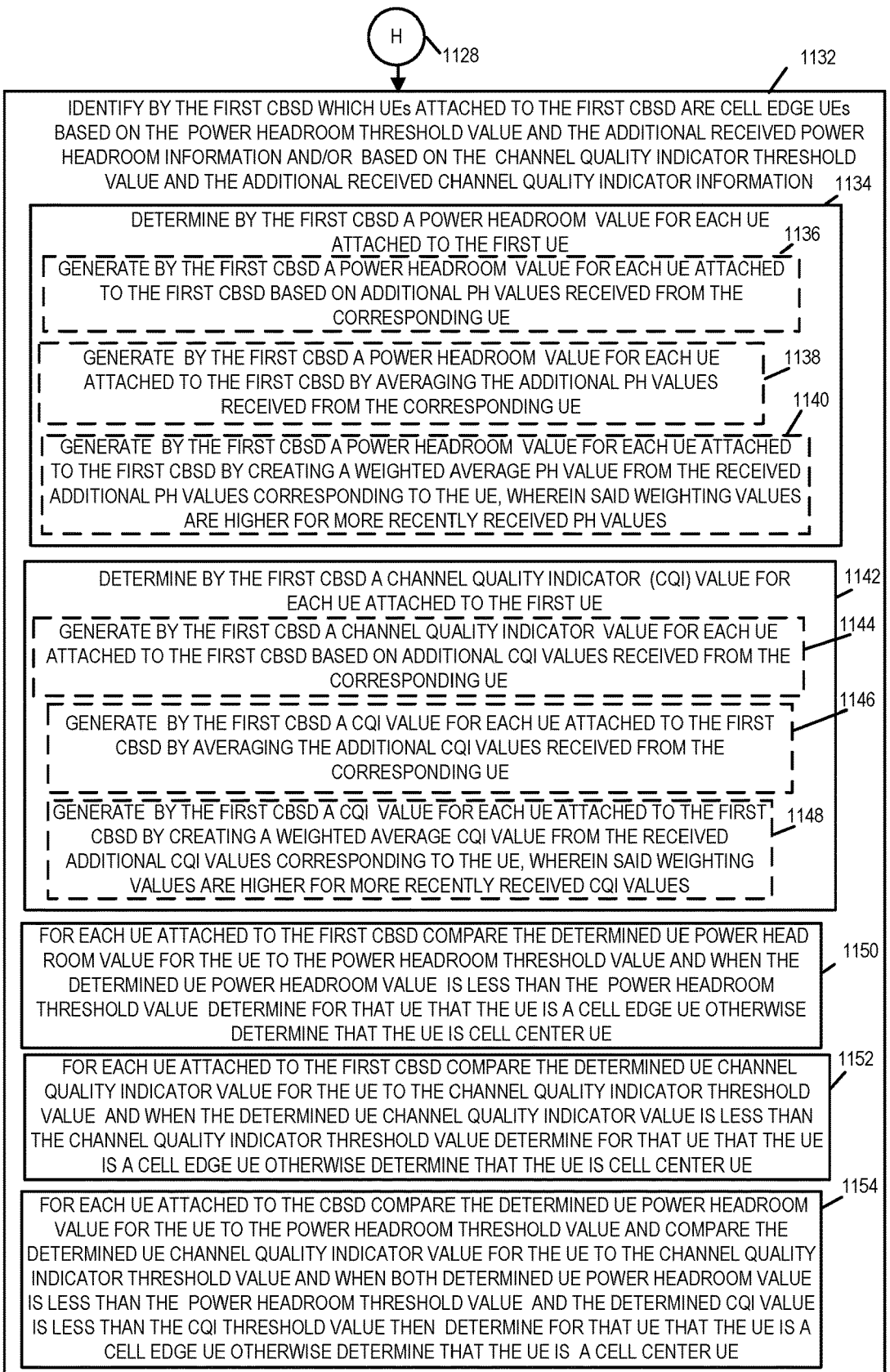
FIG. 10F illustrates the steps of the sixth part of an exemplary method in accordance with one embodiment of the present invention.
Figure 10G:
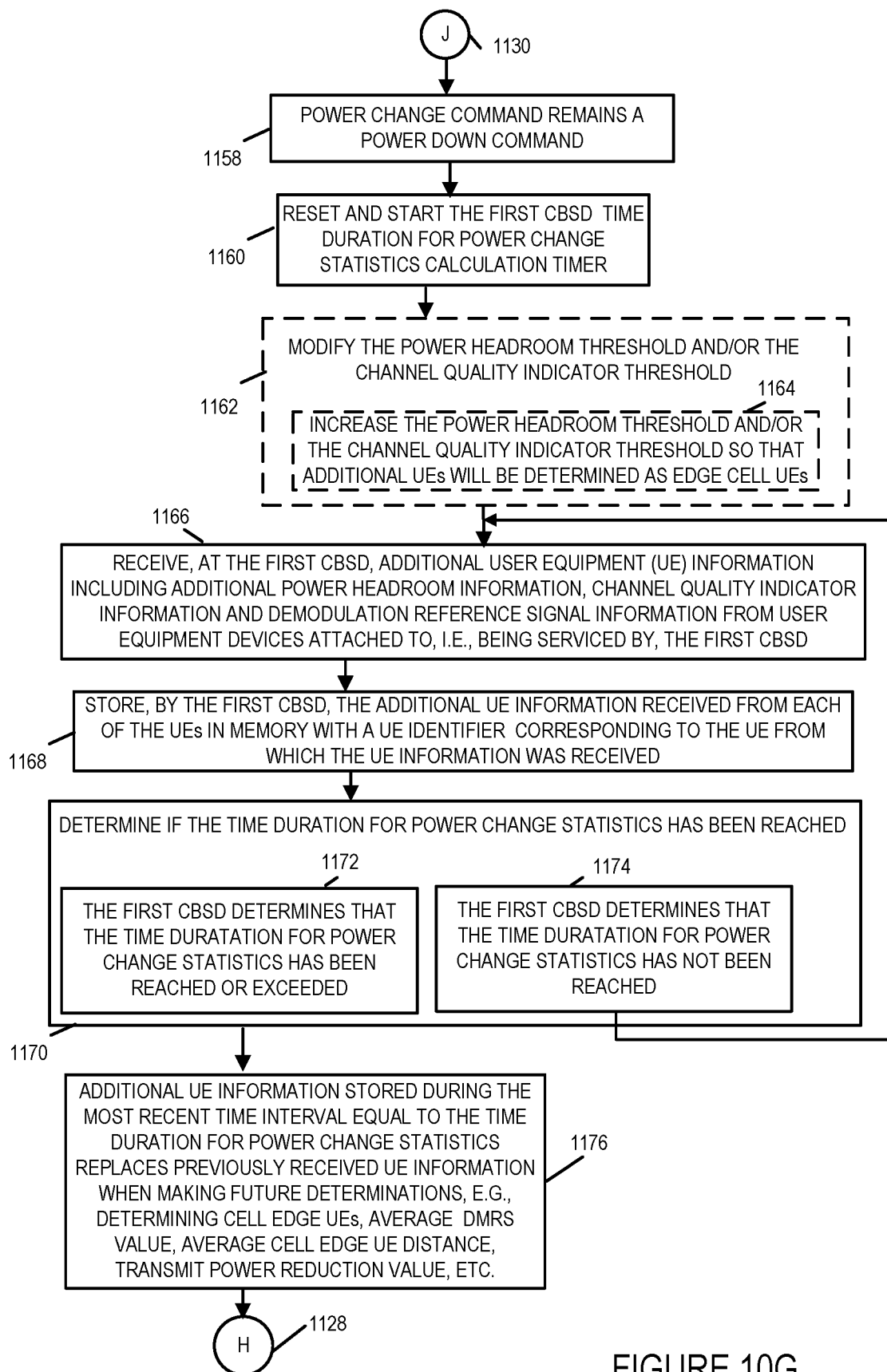
FIG. 10G illustrates the steps of the seventh part of an exemplary method in accordance with one embodiment of the present invention.
Figures 10, 10H:
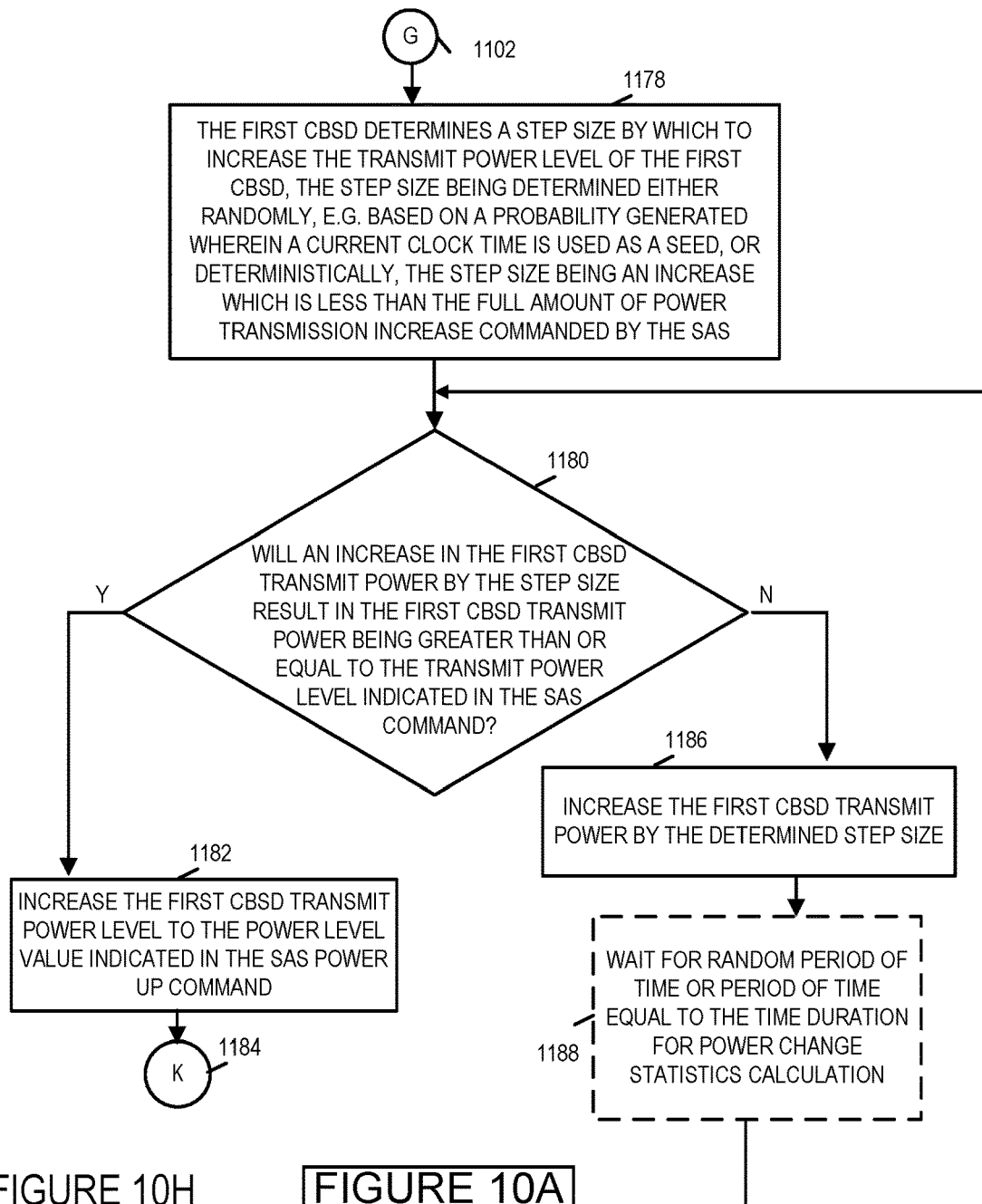
FIG. 10 illustrates the combination of FIGS. 10A, 10B, 10C, 10D, 10E, 10F, 10G, and 10H.
FIG. 10H illustrates the steps of the eighth part of an exemplary method in accordance with one embodiment of the present invention.

FIG. 10 illustrates the combination of FIGS. 10A, 10B, 10C, 10D, 10E, 10F, 10G, and 10H. Method 1000 illustrated in FIG. 10 is another exemplary method embodiment of managing CBSD transmit power in a CBRS network in accordance with one embodiment of the present invention. FIG. 10A illustrates the steps of the first part of an exemplary method 1000 in accordance with one embodiment of the present invention. FIG. 10B illustrates the steps of the second part of an exemplary method 1000 in accordance with one embodiment of the present invention. FIG. 10C illustrates the steps of the third part of an exemplary method 1000 in accordance with one embodiment of the present invention. FIG. 10D illustrates the steps of the fourth part of an exemplary method 1000 in accordance with one embodiment of the present invention. FIG. 10E illustrates the steps of the fifth part of an exemplary method 1000 in accordance with one embodiment of the present invention. FIG. 10F illustrates the steps of the sixth part of an exemplary method 1000 in accordance with one embodiment of the present invention. FIG. 10G illustrates the steps of the seventh part of an exemplary method 1000 in accordance with one embodiment of the present invention. FIG. 10H illustrates the steps of the eighth part of an exemplary method 1000 in accordance with one embodiment of the present invention.

For explanatory purposes the exemplary method 1000 will be explained in connection with the exemplary communications system 100 illustrated in FIG. 1 although it should be understand that the method may be implemented using other systems and other system configurations then those illustrated in FIG. 1.

The method 1000 shown in FIG. 10 will now be discussed in detail. The method starts in start step 1002 shown on FIG. 10A with the devices in communications system 100 being initialized and becoming operational. Operation proceeds from start step 1002 to step 1004.

In step 1004, a first Citizens Broadband Radio Service Device (CBSD), e.g., CBSD 1 102 of system 100, is operated to transmit a registration request to a Spectrum Access System (SAS), e.g., SAS 1 106 of system 100, of a Citizens Broadband Radio Service Network, e.g., system 100. Operation proceeds from step 1004 to step 1006.

In step 1006, the SAS receives the first CBSD registration request and in response to the first CBSD registration request registers the first CBSD and generates a registration success response message. Operation proceeds from step 1006 to step 1008.

In step 1008, in response to the first CBSD registration request, the SAS transmits the registration success response message to the first CBSD. Operation proceeds from step 1008 to step 1010.

In step 1010, the first CBSD receives the registration response message transmitted from the SAS. Operation proceeds from step 1010 to step 1012.

In step 1012, in response to the successful registration of the first CBSD, the SAS transmits to the first CBSD a time duration value, e.g., a minimum time duration, for power change statistics calculations and/or a minimum number of samples to be used for power change statistics calculation, e.g., collecting and determining UE power headroom values and collecting and determining UE channel quality indicator values. Operation proceeds from step 1012 to step 1014.

In step 1014, the first CBSD receives from the SAS the time duration for power change statistics calculations and/or the minimum number of samples to be used for power change statistics calculations. Operation proceeds from step 1014 to step 1016.

In step 1016, in response to the successful registration of the first CBSD, the SAS transmits to the first CBSD a power headroom threshold value. Operation proceeds from step 1016 to step 1018.

In step 1018, the first CBSD receives from the SAS the power headroom threshold value. Operation proceeds from step 1018 to step 1020.

In step 1020, in response to the successful registration of the first CBSD, the SAS transmits to the first CBSD a channel quality indicator threshold value. Operation proceeds from step 1020 to step 1022.

In step 1022, the first CBSD receives from the SAS the channel quality indicator threshold value. Operation proceeds from step 1022 via connection node C 1024 to step 1026 shown on FIG. 10B.

In step 1026, in response to the successful registration of the first CBSD, the SAS transmits to the first CBSD, a path loss model identifier or a path-loss model for calculating distance to a UE. In embodiments in which the SAS transmits an identifier of a path-loss model for calculating distance to a UE instead of the path-loss model, the path-loss model identifier identifies a path-loss model stored in the first CBSD memory or accessible to the first CBSD. The path-loss model being a function of a UE demodulated reference signal so that the distance to a UE can be determined from a UE demodulated reference signal or values, e.g., power values, derived therefrom. In some embodiments, step 1026 includes sub-step 1028. In sub-step 1028 the SAS also transmits to the first CBSD one or more parameters for use with the path-loss model. The path-loss model being an equation. Operation proceeds from step 1028 to step 1030.

In step 1030, the first CBSD receives from the SAS the path-loss model identifier or the path-loss model. In some embodiments, step 1030 includes sub-step 1032 in which the first CBSD receives the one or more parameters for the path-loss model. Operation proceeds from step 1030 to step 1034.

In some embodiments, the time duration for power change statistics calculations, the minimum number of samples for power change statistics calculations, the power headroom threshold value, the channel quality indicator value threshold, and the path-loss model or path-loss model identifier are communicated to the first CBSD from the SAS during a CBSD device registration or attachment phase. In some embodiments, one or more of the aforementioned items are transmitted as parameters of a single message or multiple messages.

In step 1034, the first CBSD starts a time duration for power change statistics calculation timer, e.g., a software or hardware timer. Operation proceeds from step 1034 to step 1036.

In step 1036, the first CBSD receives user equipment (UE) information including power headroom (PH) information, channel quality indicator (CQI) information and demodulation reference signal (DMRS) information from user equipment devices attached to, i.e., being serviced by, the first CBSD. Operation proceeds from step 1036 to step 1038.

In step 1038, the first CBSD stores the UE information received or collected from each the UEs in memory with an UE identifier corresponding to the UE from which the UE information was received so that the UE information corresponding to each UE can be associated, identified and retrieved. Operation proceeds from step 1038 to optional decision step 1040.

In optional decision step 1040, the first CBSD determines if the number of UE samples received or collected by the first CBSD is equal to or greater than the minimum number of samples to be used for calculating power change statistics. Operation proceeds from optional step 1040 to step 1042 when the first CBSD determines that the number of samples received or collected does not meet the minimum number of samples required for calculating power change statistics. If the number of samples received or collected does meet or exceed the minimum number of samples required for calculating power change statistics then operation proceeds from optional decision step 1040 via connection node D 1044 to step 1046 shown on FIG. 10C.

In decision step 1042, the first CBSD determines if the timer has reached the time duration value received from the SAS which is typically a minimum time duration value. If the first CBSD determines that the time duration for power change statistics timer has reached or exceeded the time duration value provided by the SAS then operation proceeds from decision step 1042 via connection node D 1044 to step 1046 shown on FIG. 10C. If the first CBSD determines that the time duration for power change statistics timer has not reached the time duration value provided by the SAS then operation proceeds from decision step 1042 to step 1036 wherein additional samples are received and then stored in step 1038. The samples being the information received from the UEs. In this way, the first CBSD receives or collects a sufficient number of samples for use in the power change statistics calculation either by the number of samples collected exceeding the minimum number of samples or by meeting the duration time designated for collecting samples. In this exemplary arrangement, the time duration acts as a limit on the amount of time used to collect samples so that a calculation can made in a reasonable amount of time as designated by the SAS.

In step 1046, the first CBSD identifies which UEs attached to, i.e., are being serviced by, the first CBSD are cell edge UEs based on the power headroom threshold value and the received power headroom information and/or based on the channel quality indicator threshold value and the received channel quality indicator information. In various embodiments, step 1046 includes one or more sub-steps 1048, 1056, 1064, 1068, and 1070.

In sub-step 1048, the first CBSD determines a power headroom value for each UE attached to the first UE. Sub-step 1048 may, and in some embodiments does, include one or more of the sub-steps 1050, 1052, and 1054. In sub-step 1050, the first CBSD generates a power headroom value for each UE attached to the first CBSD based on the power headroom (PH) values received from the corresponding UE. In sub-step 1052, the first CBSD generates a power headroom value for each UE attached to the first CBSD by averaging the power headroom (PH) values received from the corresponding UE. In sub-step 1054, the first CBSD generates a power headroom value for each UE attached to the first CBSD by creating a weighted average power headroom value from the received power headroom values corresponding to the UE. In some embodiments, the weighting values or factors are higher for more recently received power headroom values.

In sub-step 1056, the first CBSD determines a channel quality indicator (CQI) value for each UE attached to the first CBSD. In various embodiments, step 1056 includes one or more sub-steps 1058, 1060, and 1062.

In sub-step 1058, the first CBSD generates a channel quality indicator value for each UE attached to the first CBSD based on channel quality indicator (CQI) values received from the corresponding UE. In sub-step 1060, the first CBSD generates a channel quality indicator value for each UE attached to the first CBSD by averaging the channel quality indicator values received from the corresponding UE. In sub-step 1062, the first CBSD generates a channel quality indicator value by creating a weighted average channel quality indicator value from the received channel quality indicator values corresponding to the UE. In some embodiments, the weighting values or factors are higher for more recently received channel quality indicator values.

In sub-step 1064, for each UE attached to the first CBSD, the first CBSD compares the determined UE power headroom value for the UE to the power headroom threshold value and when the determined UE power headroom value is less than the power headroom threshold value, the first CBSD determines that the UE is a cell edge UE otherwise it determines that the UE is not a cell edge UE but is a cell center UE.

In sub-step 1068, for each UE attached to the first CBSD, the first CBSD compares the determined UE channel quality indicator value for the UE to the channel quality indicator threshold value and when the determined UE channel quality indicator value is less than the channel quality indicator threshold value, the first CBSD determines that the UE is a cell edge UE otherwise it determines that the UE is not a cell edge UE but is a cell center UE.

In sub-step 1070, for each UE attached to the first CBSD, the first CBSD compares the determined UE power headroom value for the UE to the power headroom threshold value, and the first CBSD compares the determined UE channel quality indicator value for the UE to the channel quality indicator threshold value, and when both the determined UE power headroom value is less than the power headroom threshold value and the determined UE channel quality indicator value is less than the channel quality indicator threshold value then the first CBSD determines that the UE under consideration is a cell edge UE otherwise it determines that the UE is not a cell edge UE but is a cell center UE.

Operation proceeds from step 1146 via connection node E 1072 to step 1074 shown on FIG. 10D where the execution of the method continues.

In step 1074, the SAS generates a power change command, e.g., a power down command or a power up command. The power change command may be, and in some embodiments does, provide a transmit power level to which a CBSD device is to change its transmit power level to while in some other embodiments it identifies an amount of transmit power by which the CBSD needs to decreases its power transmit level or increase its power transmit level. The SAS manages the CBSD power transmit levels so as to efficiently utilize the available frequency spectrum while minimizing interference between various devices. Operation proceeds from step 1074 to step 1076.

In step 1076, the SAS transmits the generated power change command to the first CBSD. Operation proceeds from step 1076 to step 1078.

In step 1078, the first CBSD receives the power change command from the SAS. Operation proceeds from step 1078 to step 1080.

In step 1080, the first CBSD determines whether the power change command is a power up or power down change command. In sub-step 1082, when the first CBSD makes the determination that the power change command is a power down change command operation proceeds from step 1080 to step 1086. In sub-step 1084, when the first CBSD makes the determination that the power change command is a power up change command operation proceeds from step 1080 via connection node G 1102 to step 1178 shown on FIG. 10H.

In step 1086, the first CBSD generates an average distance of the cell edge UEs from the first CBSD based on the demodulation reference signal (DMRS) information received from UEs identified as being cell edge UEs being serviced by the first CBSD. In some embodiments, step 1086 includes one or more of sub-steps 1088 and 1090. In sub-step 1088, the first CBSD generates an average DMRS value from the DMRS information received from the cell edge UEs. In sub-step 1090, the first CBSD using the path-loss model, e.g., a propagation loss model or equation, and the average DMRS value generates an average distance of the cell edge UEs from the first CBSD. In some embodiments, the average demodulation reference signal value is generated as a weighted average DMRS value. Operation proceeds from step 1086 to step 1092.

In step 1092, the first CBSD estimates an amount of transmit power required to support the UEs identified as cell edge UEs being serviced by the first CBSD. Step 1092 in some embodiments includes one or more sub-steps 1094 and 1096. In sub-step 1094, the first CBSD estimates an amount of transmit power required to support a UE located at the average distance of the cell edge UEs from the first CBSD. In sub-step 1096, the first CBSD estimates the amount of transmit power required to support the cell edge UEs attached to, i.e., being serviced by the first CBSD, based on the number of cell edge UEs and the estimated amount of power required per cell edge UE, e.g., amount of transmit power=($N_{cell\ edge\ UEs}$) (Estimated power per cell edge UE). Operation proceeds from step 1092 to step 1098.

In step 1098, the first CBSD decreases its transmit power by the estimated amount of transmit power required to support the determined cell edge UEs. Operation proceeds from step 1098 via connection node F 1100 to step 1104 shown on FIG. 10E.

In step 1104, the first CBSD determines if its transmit power level is the same or lower than the power level indicated by the SAS power down command. In sub-step 1106, when the first CBSD makes the determination that its transmit power level is the same or lower than the transmit power level indicated in the SAS power down command operation proceeds from step 1100 to step 1110. It is to be noted that the first CBSD has completed its power down operations and at this point re-enters its normal mode of operation. In sub-step 1108 when the first CBSD makes the determination that its transmit power level is higher than or greater than the transmit power level indicated in the SAS power down command operation proceeds from step 1104 via connection node J 1130 to step 1158 shown on FIG. 10G.

In step 1110, the first CBSD resets and starts the first CBSD's time duration for power change statistics calculation timer. Operation proceeds from step 1110 to step 1112.

In step 1112, the first CBSD receives and collects additional user equipment (UE) information including additional power headroom information, channel quality indicator information and demodulation reference signal information from the UEs attached, i.e., being serviced by, the first CBSD. The collection of additional UE data reduces the amount of time it takes for the first CBSD to respond to the next power change command as it will have commenced collecting additional samples and may even have stored the samples necessary to respond to the next power down command. The on-going receipt and collection of samples reduces the time necessary to respond to SAS power change commands sent to the first CBSD. Operation proceeds from step 1112 to step 1114.

In step 1114, the first CBSD stores the additional UE information received from each of the UEs in memory with a UE identifier corresponding to the UE from which the UE information was received so that it can be accessed for use in calculating power change statistics. Operation proceeds from step 1114 to step 1116.

In step 1116, the first CBSD monitors for the next power change command from the SAS. Operation proceeds from step 1116 to step 1118.

In step 1118, upon detection and/or receipt by the first CBSD of the next power change command, the first CBSD determines if the time duration for power change statistics has been reached. In sub-step 1120, the first CBSD determines that the time duration for power change statistics has been reached or exceeded and operation proceeds from step 1118 to step 1124.

In sub-step 1122, the first CBSD determines that the time duration for power change statistics has not been reached operation proceeds from step 1118 back to step 1112 where additional UE information is received and collected. In some embodiments in place of or in addition to checking whether the time duration for power change statistics has been reached or exceeded, the number of samples collected is tested to determine if the minimum number of samples have been collected to satisfy the minimum number of samples for the statistics calculations. In the case that the minimum number of samples has been met then operation proceeds from step 1118 to step 1124.

In step 1124, the additional UE information stored during the most recent time interval equal to the time duration for power change statistics replaces the previously received UE information when making future determinations, e.g., determining cell edge UEs, average DMRS value, average cell edge UE distance, transmit power reduction value, etc. That is as the first CBSD performs the steps of the method it uses the additional UE information instead of the previously used UE information. Operation proceeds from step 1124 to step 1126.

In step 1126, the first CBSD sets the power change command to be equal to the received next power change command for purposes of implementing the steps of the method. Operation proceeds from step 1126 via connection node H 1128 to step 1132 shown on FIG. 10F.

Returning to step 1104, as previously discussed when the transmit power level is determined by the first CBSD is determined to be higher than or greater the transmit power indicated in the SAS power down command operation proceeds via connection node J 1130 to step 1158 shown on FIG. 10G.

In step 1158, the power change command remains a power down change command as the steps of the method continue to be implemented. Operation proceeds from step 1158 to step 1160.

In step 1160, the first CBSD resets and starts the first CBSD time duration for power change statistics calculation timer. Operation proceeds from step 1160 to optional step 1162.

In optional step 1162, the first CBSD modifies the power headroom threshold value and/or the channel quality indicator threshold value. In some embodiments, the first CBSD makes the modification in response to an additional instruction or command sent to the first CBSD from the SAS, e.g., when the SAS determines that the first CBSD is not powering down fast enough or determines that CBRS network is still experiencing frequency spectrum interference or power transmit problems that the power down command has not rectified or alleviated. In other embodiments, the first CBSD makes a modification without receiving an additional instruction or command sent from the SAS. In some embodiments step 1162 includes sub-step 1164. In sub-step 1164, the first CBSD increases the power headroom threshold value and/or the channel quality indicator threshold value so that additional UEs will be determined to be edge cell UEs. When the optional step 1162 is implemented the modified threshold values replaced the prior threshold values in the subsequent steps of the method. Operation proceeds from step 1162 to step 1166.

In step 1166, the first CBSD receives additional user equipment information including additional power headroom information, channel quality indicator information, and demodulation reference signal information from the UEs attached to, i.e., being serviced by, the first CBSD. Operation proceeds from step 1166 to step 1168.

In step 1168, the first CBSD stores the additional UE information received from each of the UEs in memory with a UE identifier corresponding to the UE from which the UE information was received. Operation proceeds from step 1168 to step 1170.

In step 1170, the first CBSD determines if the time duration for power change statistics has been reached or exceeded. In sub-step 1174, when the first CBSD determines that the time duration for power change statistics has not been reached then operation proceeds to step 1166 where additional UE information is received and collected. In sub-step 1172, when the first CBSD determines that the time duration for power change statistics has been reached or exceeded operation proceeds from step 1170 to step 1176. In some embodiments, sub-step 1170 is replaced with a check on whether the number of samples collected is equal to or greater than the minimum number of samples required for power change command statistical calculations and operation proceed to step 1166 when the check fails and proceeds to step 1176 when the check passes. In some embodiments, the check on whether the number of samples collected is sufficient is made before the expiration of the timer expiration is checked similar to operation of the checks and decisions made in steps 1040 and 1042.

In step 1176, the first CBSD replaces the previously received/collected UE information with the additional UE information stored during the most recent time interval equal to the time duration for power change statistics when making further determinations, e.g., determining cell edge UEs, average DMRS value, average cell edge UE distance, transmit power reduction value, etc. That is as the first CBSD continues executing the steps of the method the additional UE information is used in place of the UE information previously received and used. Operation proceeds from step 1176 via connection node H 1128 to step 1132 shown on FIG. 10F.

In step 1132, the first CBSD identifies the cell edge UEs attached to the first CBSD based on the power headroom threshold value and the additional received power headroom information and/or based on the channel quality indicator threshold value and the additional received channel quality indicator information. In various embodiments, step 1132 includes one or more sub-steps 1134, 1142, 1150, 1152, and 1154.

In sub-step 1134, the first CBSD determines a power headroom value for each UE attached to the first UE. Sub-step 1134 may, and in some embodiments does, include one or more of the sub-steps 1136, 1138, and 1140. In sub-step 1136, the first CBSD generates a power headroom value for each UE attached to the first CBSD based on the additional power headroom (PH) values received from the corresponding UE. In sub-step 1138, the first CBSD generates a power headroom value for each UE attached to the first CBSD by averaging the additional power headroom (PH) values received from the corresponding UE. In sub-step 1140, the first CBSD generates a power headroom value for each UE attached to the first CBSD by creating a weighted average power headroom value from the received additional power headroom values corresponding to the UE. In some embodiments, the weighting values or factors are higher for more recently received power headroom values.

In sub-step 1142, the first CBSD determines a channel quality indicator (CQI) value for each UE attached to the first CBSD. In various embodiments, step 1142 includes one or more sub-steps 1144, 1146, and 1148.

In sub-step 1144, the first CBSD generates a channel quality indicator value for each UE attached to the first CBSD based on additional channel quality indicator (CQI) values received from the corresponding UE. In sub-step 1146, the first CBSD generates a channel quality indicator value for each UE attached to the first CBSD by averaging the additional channel quality indicator values received from the corresponding UE. In sub-step 1148, the first CBSD generates a channel quality indicator value by creating a weighted average channel quality indicator value from the received additional channel quality indicator values corresponding to the UE. In some embodiments, the weighting values or factors are higher for more recently received channel quality indicator values.

In sub-step 1150, for each UE attached to the first CBSD, the first CBSD compares the determined UE power headroom value for the UE to the power headroom threshold value and when the determined UE power headroom value is less than the power headroom threshold value, the first CBSD determines that the UE is a cell edge UE otherwise it determines that the UE is not a cell edge UE but is a cell center UE.

In sub-step 1152, for each UE attached to the first CBSD, the first CBSD compares the determined UE channel quality indicator value for the UE to the channel quality indicator threshold value and when the determined UE channel quality indicator value is less than the channel quality indicator threshold value, the first CBSD determines that the UE is a cell edge UE otherwise it determines that the UE is not a cell edge UE but is a cell center UE.

In sub-step 1154, for each UE attached to the first CBSD, the first CBSD compares the determined UE power headroom value for the UE to the power headroom threshold value, and the first CBSD compares the determined UE channel quality indicator value for the UE to the channel quality indicator threshold value, and when both the determined UE power headroom value is less than the power headroom threshold value and the determined UE channel quality indicator value is less than the channel quality indicator threshold value then the first CBSD determines that the UE under consideration is a cell edge UE otherwise it determines that the UE is not a cell edge UE but is a cell center UE.

Operation proceeds from step 1132 via connection node I 1156 to step 1180 shown on FIG. 10D where the execution of the method continues.

Returning to step 1080, when the first CBSD determines in sub-step 1084 that the power change command is a power up change command operation proceeds from step 1080 via connection node G 1102 to step 1178 as previously discussed. When a power up command has been received the first CBSD is being instructed or commanded to increase its transmit power so that it can cover a larger area and support additional UEs which are further away from the first CBSD. The power management by the SAS optimizing the usage of the available frequency spectrum. However, if the SAS has sent this power up command to multiple CBSDs and all the CBSDs attempt to increase their transmit power the maximum amount at the same time it can cause problems of interference and also problems with race conditions where many UEs are attempting to attach to one or more CBSDs at the same time. To minimize these problems the first CBSD will not increase to the maximum amount of transmit power indicated in the SAS power up command all at once but will increase its transmit power in incremental steps. The step size of the amount of transmit power increase being different for each CBSD that receives the power up command.

In step 1178, the first CBSD determines a step size by which to increase the transmit power level of the first CBSD. The step size being determined either randomly, e.g., based on a probability generated wherein a current clock time is used as a seed, or deterministically. The step size being an increase which is less than the full amount of the power transmission increase commanded or instructed by the SAS. Operation proceeds from step 1178 to decision step 1180.

In decision step 1180 the first CBSD determines whether an increase in the first CBSD transmit power by the step size will result in the first CBSD transmit power being equal to or greater than the transmit power level indicated in the SAS command. If it is determined that the increase in the transmit power level will result in the first CBSD power transmit level not being equal to or greater than the transmit power level indicated in the SAS command operation proceeds from step 1180 to step 1186.

In step 1186, the first CBSD increases the first CBSD transmit power by the determined step size. Operation proceeds from step 1186 to step optional step 1188. In optional step 1188, the first CBSD waits for a random period of time or a period of time equal to the time duration for power change statistics calculation. Upon the expiration of the time period operation proceeds from step 1188 to decision step 1180 from which the method continues.

In step 1180, when the first CBSD determines that the increase in the first CBSD transmit power by the step size will result in the first CBSD transmit power level being equal to or greater than the transmit power level indicated in the SAS command or instruction operation proceeds from step 1180 to step 1182.

In step 1182, the first CBSD transmit power level is increased to the power level value indicated in the SAS power up command. Operation proceeds from step 1182 via connection node K 1184 to step 1110 wherein the first CBSD enters a normal mode of operation. In step 1110 the first CBSD resets and starts the first CBSD time duration for power change statistics calculation timer. From step 1110 the steps of the method continue to be executed.

LIST OF SET OF EXEMPLARY NUMBERED METHOD EMBODIMENTS

Method Embodiment 1

A method of operating a Citizens Broadband Radio Service Device (CBSD) comprising: receiving from a Spectrum Access System (SAS), at the CBSD, one or more of i) a power headroom threshold value used to identify cell edge user equipment devices (UEs) or ii) a channel quality indicator threshold value used to identify cell edge user equipment devices (UEs); and receiving a power down command from the SAS; identifying based on one or more of the received power headroom threshold value and the received channel quality indicator threshold value cell edge UEs being serviced by the CBSD; and decreasing transmit power of the CBSD by an estimated amount of transmit power required to support the identified cell edge UEs.

Method Embodiment 2

The method of method embodiment 1, further comprising: receiving from the SAS at least one of: a minimum time duration for statistics calculations with regard to a UE or a minimum number of samples to be used for statistics calculations with regard to the UE.

Method Embodiment 3

The method of method embodiment 2, wherein the CBSD receives both the minimum time duration for statistics calculations with regard to a UE and the minimum number of samples to be used for statistics calculations with regard to the UE.

Method Embodiment 4

The method of method embodiment 2, further comprising: receiving signals from individual UEs, said received signals from individual UEs including, on a per UE basis, one or more of: i) UE power headroom information, ii) UE channel quality indicator information and iii) a UE demodulation reference signal.

Method Embodiment 5

The method of method embodiment 4, further comprising: determine from the received signals, for each of a plurality of UEs being serviced by the CBSD, one or more of: i) a UE power headroom value or ii) a UE channel quality indicator value.

Method Embodiment 6

The method of method embodiment 5, wherein the UE power headroom value for an individual UE is an average (e.g., weighted average) power headroom value generated from multiple signals received from the individual UE to which the UE power headroom value corresponds; and wherein the UE channel quality indicator value for an individual UE is an average (e.g., weighted average) channel quality indicator value generated from multiple signals received from the individual UE to which the UE channel quality indicator value corresponds.

Method Embodiment 7

The method of method embodiment 5, further comprising: wherein identifying cell edge UEs being serviced by the CBSD includes at least one of: i) identifying UEs with a channel quality indicator value below said channel quality indicator threshold value as cell edge UEs; and ii) identifying UEs with a power headroom value below said power headroom threshold value as cell edge UEs.

Method Embodiment 8

The method of method embodiment 5, wherein identifying cell edge UEs being serviced by the CBSD includes: identifying UEs with both i) a channel quality indicator value below said channel quality indicator threshold value as cell edge UEs and ii) a power headroom value below said power headroom threshold value as cell edge UEs.

Method Embodiment 9

The method of method embodiment 8, further comprising: receiving from the SAS a path loss model for calculating distance to a UE.

Method Embodiment 10

The method of method embodiment 9, further comprising: determining an average distance to the cell edge UEs based on the path loss model and the received signals from the identified cell edge UEs.

Method Embodiment 11

The method of method embodiment 10, further comprising: estimating an amount of transmit power required to support the identified cell edge UEs based on the number of identified cell edge UEs and an amount of transmit power required to transmit to a UE at the average distance to the cell edge UEs.

Method Embodiment 12

The method of method embodiment 11, further comprising: after decreasing the transmit power of the CBSD by the estimated amount of transmit power required to support the identified cell edge UEs, determining if the transmit power has been changed by an amount which satisfies the power down command; and if the transmit power has been changed by an amount which satisfies the power down command, continuing normal operation at the reduced power level; and if the transmit power has not been changed by an amount which satisfies the power down command: modifying at least one of the channel quality indicator threshold value or the power headroom threshold value used to identify cell edge UEs, and waiting until the amount of time or the number of samples required to be collected before identifying cell edge UEs has expired before performing an additional cell edge UE identification operation.

LIST OF SET OF EXEMPLARY NUMBERED APPARATUS EMBODIMENTS

Apparatus Embodiment 1

A Citizens Broadband Radio Service device (CBSD) comprising: one or more processors that operate the CBSD to: receive from a Spectrum Access System (SAS), at the CBSD, one or more of i) a power headroom threshold value used to identify cell edge user equipment devices (UEs) or ii) a channel quality indicator threshold value used to identify cell edge user equipment devices (UEs); and receive a power down command from the SAS; identify based on one or more of the received power headroom threshold value and the received channel quality indicator threshold value cell edge UEs being serviced by the CBSD; and decrease transmit power of the CBSD by an estimated amount of transmit power required to support the identified cell edge UEs.

Apparatus Embodiment 2

The CBSD of apparatus embodiment 1, wherein the one or more processors further operate the CBSD to: receive from the SAS at least one of: a minimum time duration for statistics calculations with regard to a UE or a minimum number of samples to be used for statistics calculations with regard to the UE.

Apparatus Embodiment 3

The CBSD of apparatus embodiment 2, wherein the one or more processors operate the CBSD to receive both the minimum time duration for statistics calculations with regard to a UE and the minimum number of samples to be used for statistics calculations with regard to the UE.

Apparatus Embodiment 4

The CBSD of apparatus embodiment 2, wherein the one or more processors further operate the CBSD to: receive signals from individual UEs, said received signals from individual UEs including, on a per UE basis, one or more of: i) UE power headroom information, ii) UE channel quality indicator information and iii) a UE demodulation reference signal.

Apparatus Embodiment 5

The CBSD of apparatus embodiment 4, wherein the one or more processors further operate the CBSD to: determine from the received signals, for each of a plurality of UEs being serviced by the CBSD, one or more of: i) a UE power headroom value or ii) a UE channel quality indicator value.

Apparatus Embodiment 6

The CBSD of apparatus embodiment 5, wherein the UE power headroom value for an individual UE is an average (e.g., weighted average) power headroom value generated from multiple signals received from the individual UE to which the UE power headroom value corresponds; and wherein the UE channel quality indicator value for an individual UE is an average (e.g., weighted average) channel quality indicator value generated from multiple signals received from the individual UE to which the UE channel quality indicator value corresponds.

Apparatus Embodiment 7

The CBSD of apparatus embodiment 5, wherein identifying cell edge UEs being serviced by the CBSD includes at least one of: i) identifying UEs with a channel quality indicator value below said channel quality indicator threshold value as cell edge UEs; and ii) identifying UEs with a power headroom value below said power headroom threshold value as cell edge UEs.

Apparatus Embodiment 8

The CBSD of apparatus embodiment 5, wherein identifying cell edge UEs being serviced by the CBSD includes: identifying UEs with both i) a channel quality indicator value below said channel quality indicator threshold value as cell edge UEs and ii) a power headroom value below said power headroom threshold value as cell edge UEs.

Apparatus Embodiment 9

The CBSD of apparatus embodiment 8, wherein the one or more processor of the CBSD further operate the CBSD to: receive from the SAS a path loss model for calculating distance to a UE.

Apparatus Embodiment 10

The CBSD of apparatus embodiment 9, wherein the one or more processors of the CBSD further operate the CBSD to: determine an average distance to the cell edge UEs based on the path loss model and the received signals from the identified cell edge UEs.

Apparatus Embodiment 11

The CBSD of apparatus embodiment 10, wherein the one or more processors of the CBSD further operate the CBSD to: estimate an amount of transmit power required to support the identified cell edge UEs based on the number of identified cell edge UEs and an amount of transmit power required to transmit to a UE at the average distance to the cell edge UEs.

Apparatus Embodiment 12

The CBSD of apparatus embodiment 11, wherein the one or more processors of the CBSD further operate the CBSD to: after decreasing the transmit power of the CBSD by the estimated amount of transmit power required to support the identified cell edge UEs, determine if the transmit power has been changed by an amount which satisfies the power down command; and if the transmit power has been changed by an amount which satisfies the power down command, continue normal operation at the reduced power level; and if the transmit power has not been changed by an amount which satisfies the power down command: modify at least one of the channel quality indicator threshold value or the power headroom threshold value used to identify cell edge UEs, and wait until the amount of time or the number of samples required to be collected before identifying cell edge UEs has expired before performing an additional cell edge UE identification operation.

LIST OF SET OF EXEMPLARY NUMBERED COMPUTER READABLE MEDIUM EMBODIMENTS

Computer Readable Medium Embodiment 1

A non-transitory computer readable medium including a first set of computer executable instructions which when executed by a processor of a Citizens Broadband Radio Service device (CBSD) cause the CBSD device to: receive from an Spectrum Access System (SAS), at the CBSD, one or more of i) a power headroom threshold value used to identify cell edge user equipment devices (UEs) or ii) a channel quality indicator threshold value used to identify cell edge user equipment devices (UEs); and receive a power down command from the SAS; identify based on one or more of the received power headroom threshold value and the received channel quality indicator threshold value cell edge UEs being serviced by the CBSD; and decrease transmit power of the CBSD by an estimated amount of transmit power required to support the identified cell edge UEs.

Computer Readable Medium Embodiment 2

The non-transitory computer readable medium of computer readable medium embodiment 1, wherein the first set of computer executable instructions which when executed by a processor of a Citizens Broadband Radio Service device (CBSD) further cause the CBSD device to: receive from the SAS at least one of: a minimum time duration for statistics calculations with regard to a UE or a minimum number of samples to be used for statistics calculations with regard to the UE.

Computer Readable Medium Embodiment 3

The non-transitory computer readable medium of computer readable medium embodiment 2, wherein the first set of computer executable instructions which when executed by a processor of a Citizens Broadband Radio Service device (CBSD) further cause the CBSD device to: operate the CBSD to receive both the minimum time duration for statistics calculations with regard to a UE and the minimum number of samples to be used for statistics calculations with regard to the UE.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, and SAS are configured to perform the steps of the methods described as being performed by the CBSD, UEs, SAS. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, with a processor which includes a component corresponding to each of the steps of the various described methods performed by the device in which the processor is included. In some but not all embodiments a device, e.g., CBSD, UE, SAS, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, UE, SAS. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a Citizens Broadband Radio Service Device (CBSD) comprising:
   receiving from a Spectrum Access System (SAS), at the CBSD, one or more of: i) a power headroom threshold value used to identify cell edge user equipment devices (UEs) or ii) a channel quality indicator threshold value used to identify cell edge user equipment devices (UEs); and
   receiving a power down command from the SAS;
   identifying based on one or more of the received power headroom threshold value and the received channel quality indicator threshold value cell edge UEs being serviced by the CBSD;
   decreasing transmit power of the CBSD by an estimated amount of transmit power required to support the identified cell edge UEs; and
   receiving from the SAS at least one of: a minimum time duration for statistics calculations with regard to a UE or a minimum number of samples to be used for statistics calculations with regard to the UE.

2. The method of claim 1, further comprising:
   receiving signals from individual UEs, said received signals from individual UEs including, on a per UE basis, one or more of: UE power headroom information, UE channel quality indicator information, and a UE demodulation reference signal.

3. The method of claim 2, further comprising:
   determine from the received signals, for each of a plurality of UEs being serviced by the CBSD, one or more of: i) a UE power headroom value or ii) a UE channel quality indicator value.

4. The method of claim 3,
   wherein the UE power headroom value for an individual UE is an average power headroom value generated from multiple signals received from the individual UE to which the UE power headroom value corresponds; and
   wherein the UE channel quality indicator value for an individual UE is an average channel quality indicator value generated from multiple signals received from the individual UE to which the UE channel quality indicator value corresponds.

5. The method of claim 3,
   wherein identifying cell edge UEs being serviced by the CBSD includes at least one of:
   i) identifying UEs with a channel quality indicator value below said channel quality indicator threshold value as cell edge UEs; and
   ii) identifying UEs with a power headroom value below said power headroom threshold value as cell edge UEs.

6. The method of claim 3, wherein identifying cell edge UEs being serviced by the CBSD includes: identifying UEs with both: i) a channel quality indicator value below said channel quality indicator threshold value and ii) a power headroom value below said power headroom threshold value as cell edge UEs.

7. The method of claim 6, further comprising:
   receiving from the SAS a path loss model for calculating distance to a UE.

8. The method of claim 7, further comprising:
   determining an average distance to the cell edge UEs based on the path loss model and the received signals from the identified cell edge UEs.

9. The method of claim 8, further comprising:
   estimating an amount of transmit power required to support the identified cell edge UEs based on the number of identified cell edge UEs and an amount of transmit power required to transmit to a UE at the average distance to the cell edge UEs.

10. A Citizens Broadband Radio Service Device (CBSD) comprising:
    one or more processors that operate the CBSD to:
    receive from a Spectrum Access System (SAS), at the CBSD, one or more of: i) a power headroom threshold value used to identify cell edge user equipment devices (UEs) or ii) a channel quality indicator threshold value used to identify cell edge user equipment devices (UEs); and
    receive a power down command from the SAS;
    identify based on one or more of the received power headroom threshold value and the received channel quality indicator threshold value cell edge UEs being serviced by the CBSD;
    decrease transmit power of the CBSD by an estimated amount of transmit power required to support the identified cell edge UEs; and
    receive from the SAS at least one of: a minimum time duration for statistics calculations with regard to a UE or a minimum number of samples to be used for statistics calculations with regard to the UE.

11. The CBSD of claim 10, wherein the one or more processors further operate the CBSD to:
    receive signals from individual UEs, said received signals from individual UEs including, on a per UE basis, one or more of: UE power headroom information, UE channel quality indicator information, and a UE demodulation reference signal.

12. The CBSD of claim 11, wherein the one or more processors further operate the CBSD to:
    determine from the received signals, for each of a plurality of UEs being serviced by the CBSD, one or more of:
    i) a UE power headroom value or ii) a UE channel quality indicator value.

13. The CBSD of claim 12,
wherein the UE power headroom value for an individual UE is an average power headroom value generated from multiple signals received from the individual UE to which the UE power headroom value corresponds; and
wherein the UE channel quality indicator value for an individual UE is an average channel quality indicator value generated from multiple signals received from the individual UE to which the UE channel quality indicator value corresponds.

14. The CBSD of claim 12,
wherein identifying cell edge UEs being serviced by the CBSD includes at least one of:
  i) identifying UEs with a channel quality indicator value below said channel quality indicator threshold value as cell edge UEs; and
  ii) identifying UEs with a power headroom value below said power headroom threshold value as cell edge UEs.

15. The CBSD of claim 12, wherein identifying cell edge UEs being serviced by the CBSD includes: identifying UEs with both: i) a channel quality indicator value below said channel quality indicator threshold value and ii) a power headroom value below said power headroom threshold value as cell edge UEs.

16. The CBSD of claim 15, wherein the one or more processor of the CBSD further operate the CBSD to:
  receive from the SAS a path loss model for calculating distance to a UE.

17. The CBSD of claim 16, wherein the one or more processors of the CBSD further operate the CBSD to:
  determine an average distance to the cell edge UEs based on the path loss model and the received signals from the identified cell edge UEs.

18. A non-transitory computer readable medium including a first set of computer executable instructions which when executed by a processor of a Citizens Broadband Radio Service Device (CBSD) cause the CBSD to:
  receive from a Spectrum Access System (SAS), at the CBSD, one or more of: i) a power headroom threshold value used to identify cell edge user equipment devices (UEs) or ii) a channel quality indicator threshold value used to identify cell edge user equipment devices (UEs); and
  receive a power down command from the SAS;
  identify based on one or more of the received power headroom threshold value and the received channel quality indicator threshold value cell edge UEs being serviced by the CBSD;
  decrease transmit power of the CBSD by an estimated amount of transmit power required to support the identified cell edge UEs; and
  receive from the SAS at least one of: a minimum time duration for statistics calculations with regard to a UE or a minimum number of samples to be used for statistics calculations with regard to the UE.

19. The method of claim 9, further comprising:
  after decreasing the transmit power of the CBSD by the estimated amount of transmit power required to support the identified cell edge UEs,
  determining if the transmit power has been changed by an amount which satisfies the power down command; and
  if the transmit power has been changed by an amount which satisfies the power down command, continuing normal operation at the reduced power level; and
  if the transmit power has not been changed by an amount which satisfies the power down command: modifying at least one of the channel quality indicator threshold value or the power headroom threshold value used to identify cell edge UEs, and waiting until the amount of time or the number of samples required to be collected before identifying cell edge UEs has expired before performing an additional cell edge UE identification operation.

20. The CBSD of claim 17, wherein the one or more processors of the CBSD further operate the CBSD to:
  estimate an amount of transmit power required to support the identified cell edge UEs based on the number of identified cell edge UEs and an amount of transmit power required to transmit to a UE at the average distance to the cell edge UEs.

* * * * *